United States Patent
Kuribayashi

[11] Patent Number: 6,167,008
[45] Date of Patent: Dec. 26, 2000

[54] SKEW DETECTING METHOD AND APPARATUS FOR OPTICAL DISC

[75] Inventor: Hiroki Kuribayashi, Tsurugashima, Japan

[73] Assignee: Pioneer Electronic Corporation, Tokyo, Japan

[21] Appl. No.: 08/905,080

[22] Filed: Aug. 1, 1997

[30] Foreign Application Priority Data

Aug. 1, 1996 [JP] Japan .................................. 8-203956

[51] Int. Cl.[7] ...................................................... G11B 7/00
[52] U.S. Cl. ............................ 369/44.32; 369/59; 369/54
[58] Field of Search ............................. 369/44.32, 44.34, 369/44.27, 44.28, 44.29, 44.41, 42, 48, 49, 54, 58, 59, 32

[56] References Cited

U.S. PATENT DOCUMENTS

| | | | |
|---|---|---|---|
| 5,442,615 | 8/1995 | Ohsato et al. | 369/44.32 X |
| 5,483,512 | 1/1996 | Yanagawa | 369/44.32 X |
| 5,546,367 | 8/1996 | Yoshimura et al. | 369/44.32 |
| 5,703,855 | 12/1997 | Kirino et al. | 369/44.32 X |
| 5,719,847 | 2/1998 | Tateishi et al. | 369/44.32 X |

*Primary Examiner*—Muhammad Edun
*Attorney, Agent, or Firm*—Morgan, Lewis & Bockius LLP

[57] ABSTRACT

A skew detecting method for easily performing a detection of a tangential skew occurring between a recording surface of an optical disc and a pickup with a high reliability. A reflection light when a reading beam is irradiated to the recording surface of the optical disc is received and converted into an electric signal. The electric signal is used as a read signal. An error value between each read sampling value in a read sample sequence obtained by sampling the read signal and a prediction value is obtained. The tangential skew is detected based on the error value when a polarity of the read sampling value obtained at a time point that is preceding to a time point when the error value is derived by a predetermined time and a polarity of the read sampling value obtained at a time point that is subsequent to the time point when the error value is derived by the predetermined time are different.

21 Claims, 17 Drawing Sheets

READING DIRECTION

READING DIRECTION

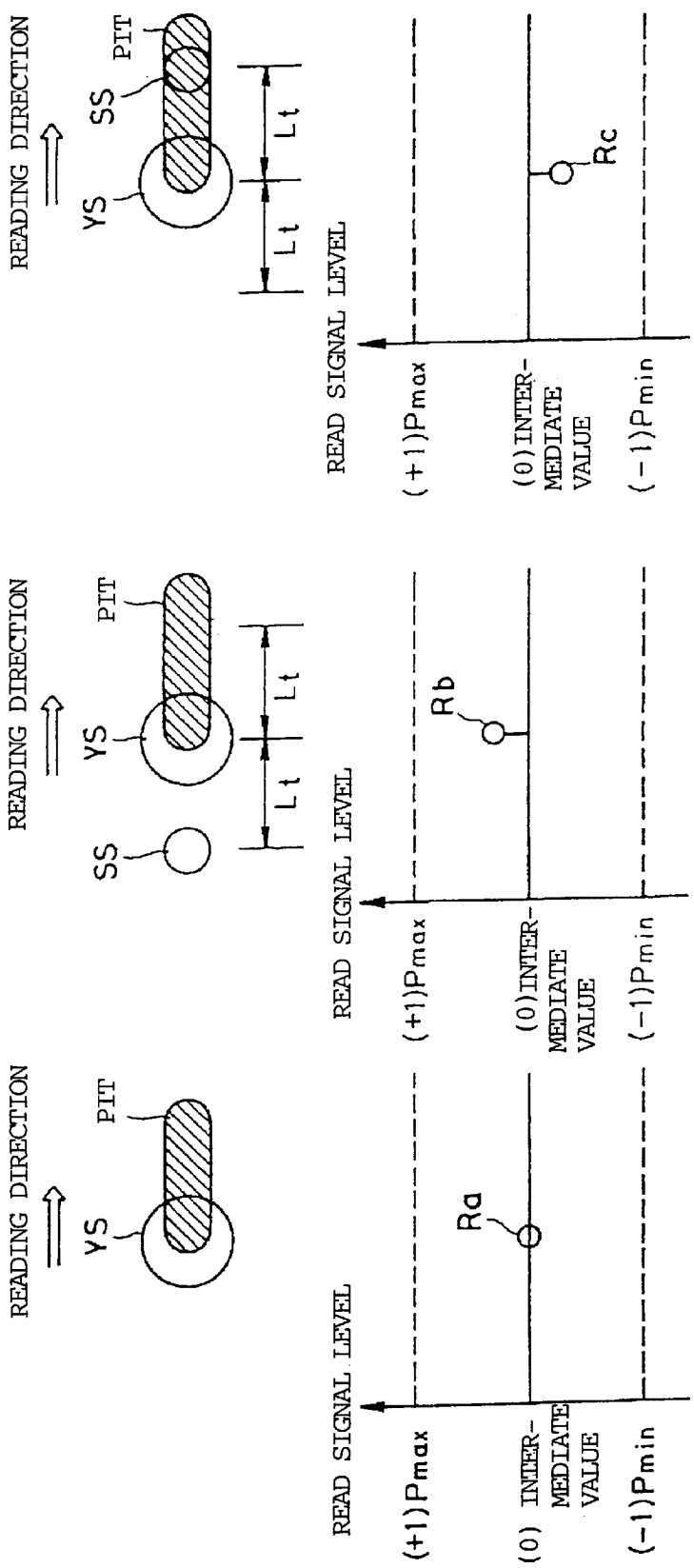

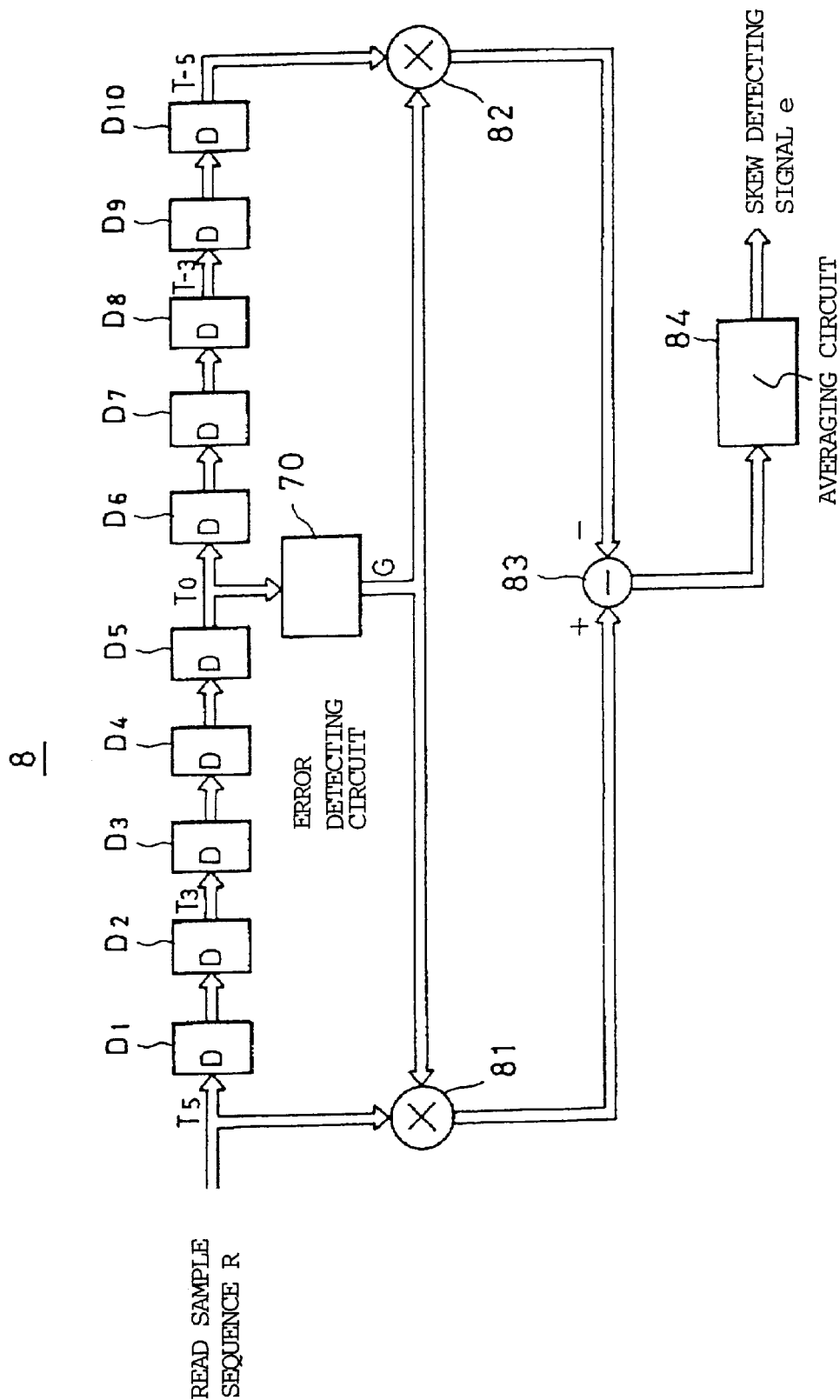

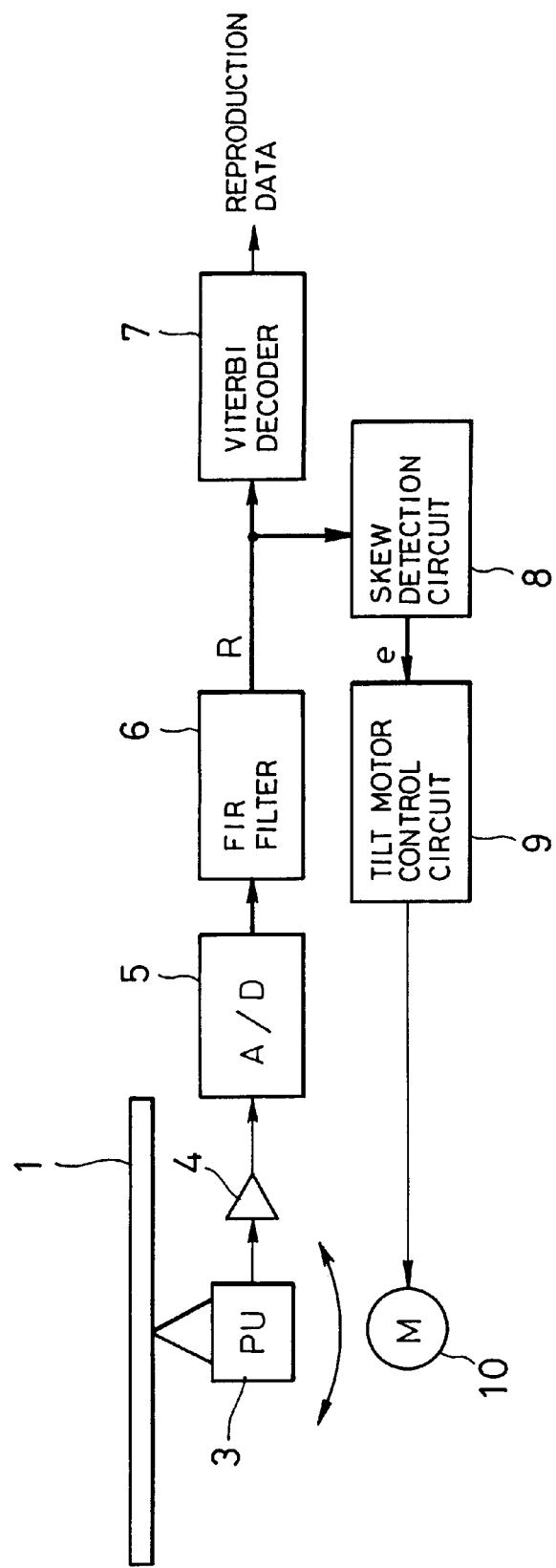

SKEW DETECTING METHOD AND APPARATUS FOR OPTICAL DISC

BACKGROUND OF THE INVENTION

1. Field of the Invention

The present invention relates to method and apparatus for detecting a skew occurring between a recording surface of an optical disc and a pickup, and more particularly, to skew detecting method and apparatus for detecting a skew in the tangential direction.

2. Description of Related Art

In order to correctly read recording data from a disk-shaped optical disc on which digital data has been recorded as a pit train, a light beam for reading to be irradiated onto the disc needs to be correctly irradiated onto a pit.

When the optical disc is curved, however, an information reading beam is irradiated with an inclination (skew) onto the disc surface. In this case a wavefront aberration, in which a coma aberration is a main component, increases and a waveform of a read signal will be distorted.

In reproducing apparatuses for reproducing recording information from the optical disc, a tilt sensor for detecting an inclination amount (hereinbelow, called a skew amount) of an irradiation angle of the information reading beam for the disc surface is provided. By performing a filtering process to the read signal on the basis of equalizing characteristics according to the skew amount detected by the tilt sensor, the distorted waveform is compensated.

In the case of manufacturing the reproducing apparatus having the tilt sensor, however, since an attaching angle of the tilt sensor itself has to be precisely adjusted, there is a problem such that an assembly of the reproducing apparatus is difficult.

When a detection sensitivity of the tilt sensor is fluctuated due to an aging change or the like, since the filtering process is performed by the erroneous equalizing characteristics, a problem of deterioration of the reliability in a waveform compensation occurs.

OBJECTS AND SUMMARY OF THE INVENTION

It is, therefore, an object of the invention to provide a skew detecting method for easily detecting a tangential skew occurring between a recording surf ace of an optical disc and a pickup with a high reliability.

According to the invention, there is provided a skew detecting method in a skew detecting apparatus of an optical disc for detecting a tangential skew occurring between a pickup and a recording surface of said optical disc, said pickup receiving a reflection light when a reading beam is irradiated onto the recording surface of the optical disc and converting the reflection light into an electric signal and obtaining the electric signal as a read signal, wherein the method comprises the steps of: obtaining an error value between each read sampling value in a read sample sequence obtained by sampling the read signal and a prediction value; and detecting the tangential skew on the basis of the error value when a polarity of a read sampling value obtained at a time point which is preceding to a time point when the error value is obtained by a predetermined time and a polarity of a read sampling value obtained at a time point which is subsequent to the time point when the error value is obtained by a predetermined time are different.

BRIEF DESCRIPTION OF THE DRAWINGS

FIGS. 4A to 4C are diagrams each showing a reading beam spot irradiated onto an edge portion of a pit on an optical disc 1 and a read sampling value;

FIG. 5 is a diagram showing a circuit construction of the skew detecting apparatus 8 according to the invention;

FIG. 17 is a diagram showing another construction of a recording information reproducing apparatus having the skew detecting apparatus 8 according to the invention.

DETAILED DESCRIPTION OF THE PREFERRED EMBODIMENTS

Embodiments of the invention will be described in detail hereinbelow with reference to the drawings.

Figure 1:
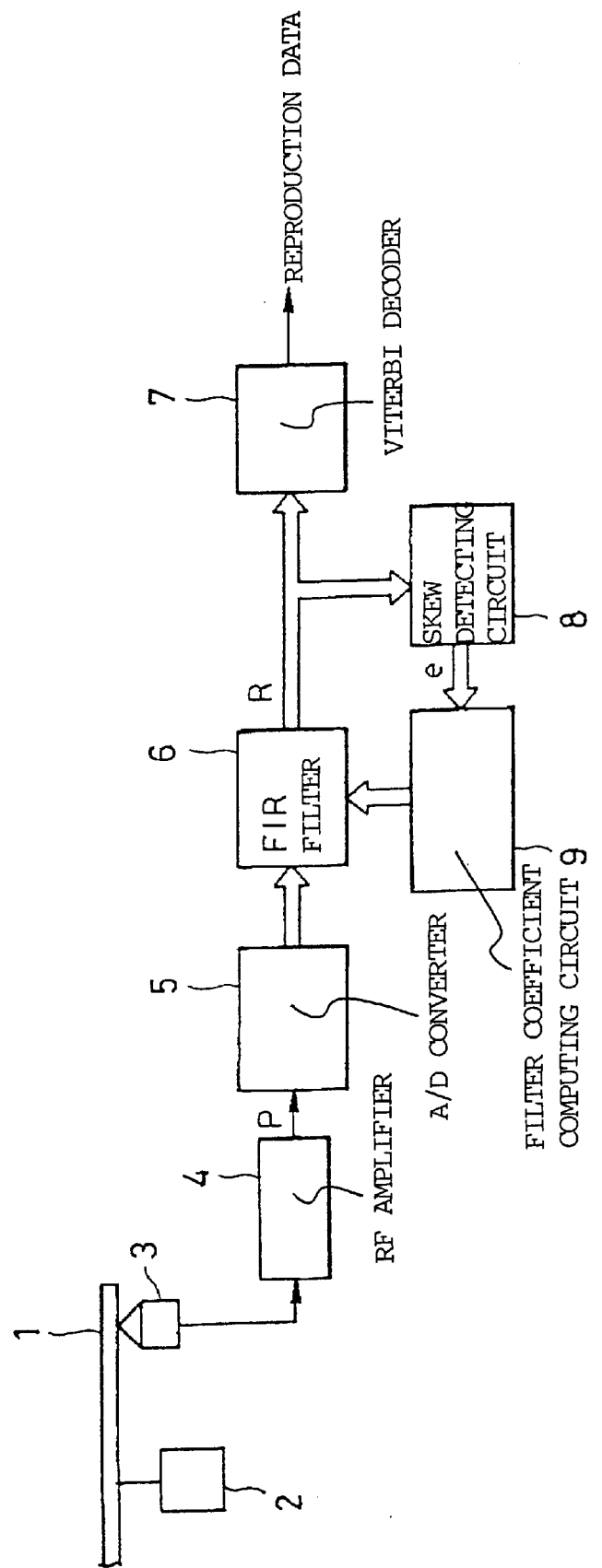
FIG. 1 is a diagram showing a construction of a recording information reproducing apparatus having a skew detecting apparatus 8 according to the invention.

FIG. 1 is a diagram showing a construction of a recording information reproducing apparatus having a skew detecting apparatus 8 according to the invention.

In FIG. 1, digital data is recorded as a pit train along spiral or concentric tracks on a disk-shaped optical disc 1. A pickup 3 irradiates a reading beam having a wavelength $\lambda$ from an objective lens to the optical disc 1. The pickup 3 receives a reflection light reflected by the optical disc 1 by the irradiation of the reading beam, converts it into an analog electric signal, and outputs it as a read signal. A spindle motor 2 rotates the optical disc 1 so that a reading linear velocity by the pickup 3 is equal to $V_L$.

The read signal as an RF signal generated from the pickup 3 is amplified by an RF amplifier 4 and, after that, digitized by an A/D converter 5. A read signal (P) amplified by the RF amplifier 4 is converted to a digital sampling value every sampling clock of a frequency $f_s$ and a read sample sequence consisting of the sampling value sequence is supplied to an FIR filter 6.

In the embodiment, it is presumed that a transmitting system from the recording to the reproduction of information to/from the optical disc 1 is a partial response transmitting system class I. The read sample sequence obtained by sampling the read signal (P) derived from the transmitting system by a channel clock crosses at a zero point and its read sampling value is a discrete signal having any one of the values of "1", "0", and "−1".

The FIR filter 6 is, for example, a variable coefficient filter and obtains a read sample sequence (R) whose waveform is compensated by filtering the read sample sequence by a filter coefficient supplied from a filter coefficient computing circuit 9, which will be described later, and supplies to each of a Viterbi decoder 7 and a skew detecting apparatus 8. The Viterbi decoder 7 decodes a most likelihood binary data sequence on the basis of the read sample sequence (R) and outputs it as reproduction data.

The skew detecting apparatus 8 detects an inclination (tangential skew) of the optical disc 1 in an information reading direction of the pickup 3 on the basis of an error occurring in each read sample in the read sample sequence (R) and supplies a detected tangential skew detection signal (e) to the filter coefficient computing circuit 9.

Figure 2A:
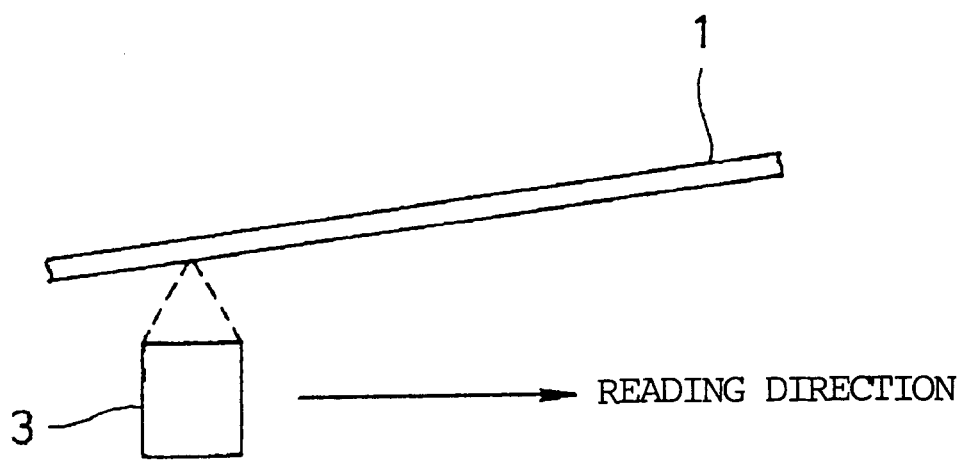
FIGS. 2A and 2B are diagrams each showing a state of a tangential skew.

For example, when the optical disc 1 is inclined in the direction shown in FIG. 2A for the reading direction of the pickup 3, the skew detecting apparatus 8 supplies the skew detection signal (e) of the positive polarity corresponding to the inclination in the tangential direction to the filter coefficient computing circuit 9. When the optical disc 1 is inclined in the direction shown in FIG. 2B, the skew detecting apparatus 8 supplies the skew detection signal (e) of the negative polarity corresponding to the inclination to the filter coefficient computing circuit 9.

The filter coefficient computing circuit 9 obtains a filter coefficient according to the skew detection signal (e) and supplies it to the FIR filter 6.

By the above construction composed of the FIR filter 6, skew detecting apparatus 8, and filter coefficient computing circuit 9, the read sample sequence (R) in which an influence by the tangential skew occurring in the optical disc 1 is eliminated and the waveform is compensated is supplied to the Viterbi decoder 7.

A principle of the tangential skew detection in the skew detecting apparatus 8 will now be described.

Figure 2B:
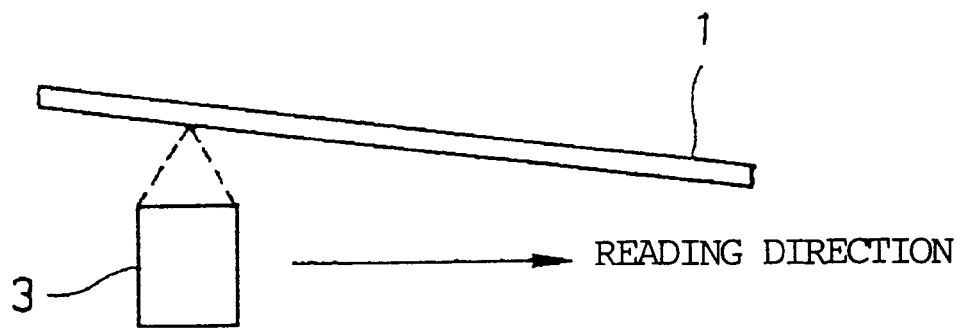
Figure 3A:
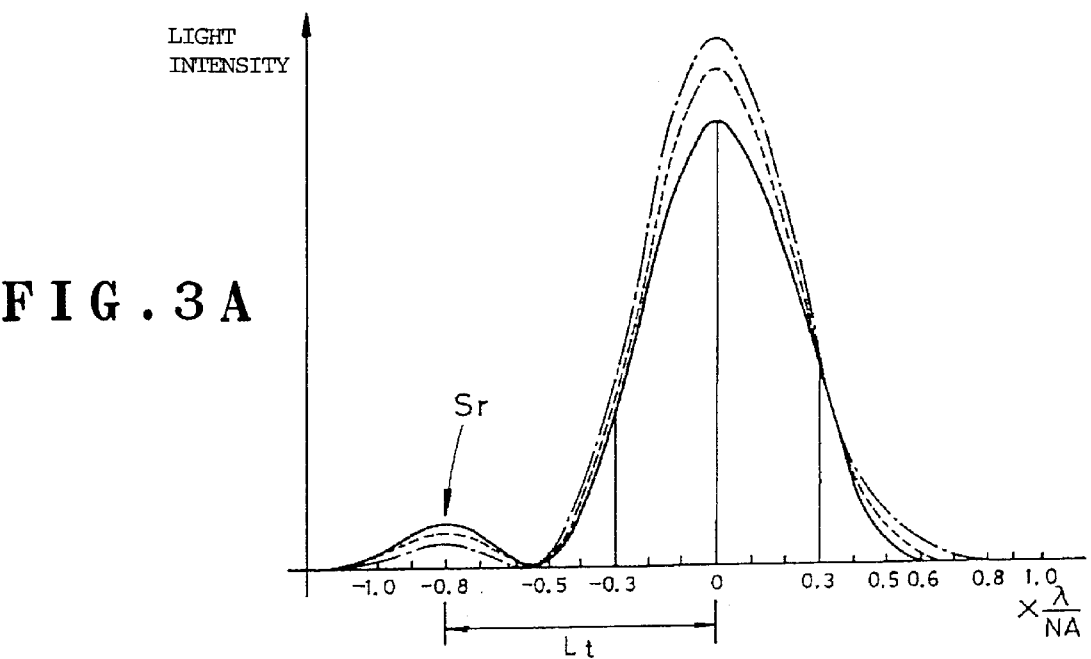
FIGS. 3A and 3B are diagrams each showing a spot profile when the tangential skew occurs.
Figure 3B:
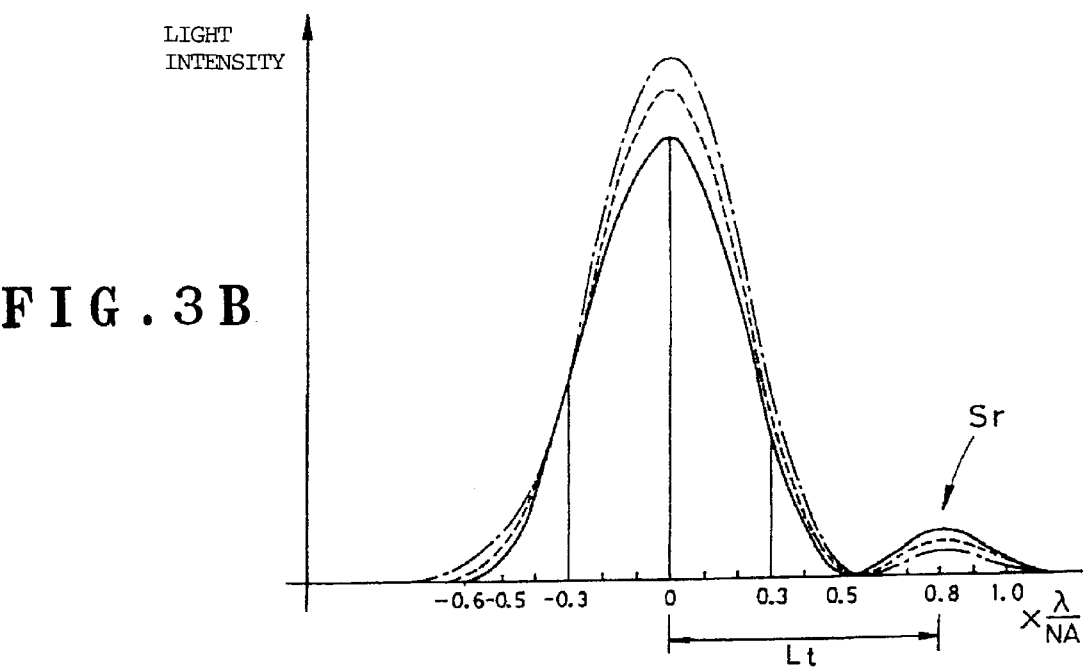

FIG. 3A is a diagram showing a spot profile in the tangential direction of a light spot which is converged on the recording surface of the optical disc 1 when a tangential skew in the positive direction as shown in FIG. 2A occurs. FIG. 3B is a diagram showing a spot profile in the tangential direction of the light spot which is converged on the recording surface of the optical disc 1 when a tangential skew in the negative direction as shown in FIG. 2B occurs.

As shown in FIGS. 3A and 3B, when the tangential skew occurs, the spot profile of the light spot converged on the recording surface of the optical disc 1 by the irradiation of the reading beam is asymmetrical with respect to the zero axis at which the maximum light intensity is obtained as a center. The zero axis corresponds to an optical axial center of the reading beam.

For example, in FIG. 3A, a light intensity at a position apart from the zero axis as an optical axial center by a distance of 0.3·(λ/NA) to 0.6·(λ/NA) in the reading direction is larger than a light intensity at a position apart from the zero axis by a distance of −0.3·(λ/NA) to −0.6·(λ/NA). Further, a side lobe Sr which is not seen in a range from 0.6·(λ/NA) to 1.0·(λ/NA) occurs in a range from −0.6·(λ/NA) to −1.0·(λ/NA) with respect to the position apart from the zero axis by a distance of [Lt=−0.8·(λ/NA)] as a center.

On the other hand, when the tangential skew in the negative direction occurs, as shown in FIG. 3B, a light intensity at a position apart from the zero axis by a distance of 0.3·(λ/NA) to 0.6·(λ/NA) is smaller than a light intensity at a position apart from the zero axis by a distance of −0.3·(λ/NA) to −0.6·(λ/NA). Further, the side lobe Sr which is not seen in a range from −0.6·(λ/NA) to −1.0·(λ/NA) occurs in a range from 0.6·(λ/NA) to 1.0·(λ/NA) with respect to the position apart from the zero axis by a distance of [Lt=0.8·(λ/NA)] as a center. NA denotes a numerical aperture of the objective lens of the pickup 3 and λ denotes a wavelength of the reading beam.

That is, in the spot profile in the tangential direction of the light spot converged on the recording surface of the optical disc 1 by the irradiation of the reading beam, portions in which the light intensities at the preceding and subsequent positions each apart from the position where the maximum light intensity is obtained by the same distance are different exist in the range around Lt as a center as mentioned above.

As shown in FIGS. 3A and 3B, even if the amount of the tangential skew increases by 0.3 degree (alternate long and short dash line), 0.6 degree (broken line), and 0.9 degree (solid line), the occurrence position of the side lobe Sr is not changed.

FIGS. 4A to 4C are diagrams each showing a read sampling value obtained when a beam spot YS is irradiated onto an edge portion of a pit formed on the recording surface of the optical disc 1.

FIG. 4A is a diagram showing an example of a case where no tangential skew occurs. FIG. 4B is a diagram showing an example of a case where a tangential skew in the positive direction occurs. FIG. 4C is a diagram showing an example of a case where a tangential skew in the negative direction occurs. In the diagrams, the side lobes shown in FIGS. 3A and 3B are expressed as a side spot SS for convenience of explanation.

As shown in FIGS. 4B and 4C, when the tangential skew occurs, not only the reading beam spot YS as a main spot but also the side spot SS are formed on the recording surface of the optical disc 1. The side spot SS occurs due to an influence by the side lobe Sr in FIGS. 3A and 3B. When the tangential skew in the positive direction occurs, therefore, as shown in FIG. 4B, the side spot SS is formed at a position behind (with respect to the reading direction) the reading beam spot YS by the distance of Lt. When the tangential skew in the negative direction occurs, as shown in FIG. 4C, the side spot SS is formed at a position before the reading beam spot YS by the distance of Lt.

That is, when the tangential skew occurs, the pickup 3 receives not only the reflection light by the reading beam spot YS but also a reflection light by the side spot SS as a leakage light.

When no tangential skew occurs as shown in FIG. 4A, a level of the read signal obtained when the reading beam spot YS traces a mirror surface portion is equal to $P_{max}$ and a level of the read signal obtained when the reading beam spot YS traces the pit is equal to $P_{min}$. In the case of presuming the partial response transmitting system class I as mentioned above, $P_{max}$ is detected as "1", $P_{min}$ is detected as "−1", and an intermediate value between $P_{max}$ and $P_{min}$ is detected as "0".

When no tangential skew occurs, as shown in FIG. 4A, a read sampling value $R_a$ obtained when the reading beam spot YS traces the edge portion of the pit, that is, a boundary between the mirror surface portion and the pit is equal to the intermediate value between $P_{max}$ and $P_{min}$. This is because since the reading beam spot YS equally irradiates the mirror surface portion and the pit portion, respectively, the light intensity by the reflection light is equal to 50% of that in the case where the reading beam spot YS is irradiated only onto the mirror surface portion.

On the other hand, when the tangential skew in the positive direction occurs, as shown in FIG. 4B, the side spot SS exists at a position behind the reading beam spot YS by the distance of Lt.

When the tangential skew in the positive direction as shown in FIG. 4B occurs, therefore, if it is assumed that a reflectance of the mirror surface portion is equal to 1 and a reflectance of the pit portion is equal to 0 for simplicity of explanation, the level of the read signal obtained when both of the reading beam spot YS and the side spot SS trace the mirror surface portion is equal to $P_{max}$. That is, the level of the read signal obtained by including not only the reflection light from the mirror surface portion by the reading beam spot YS but also the leakage light from the mirror surface portion by the side spot SS is equal to $P_{max}$. Similarly, the level of the read signal obtained when both of the reading beam spot YS and side spot SS trace the pit is equal to $P_{min}$. In this case, a read sampling value $R_b$ obtained when the reading beam spot YS traces the edge portion of the pit is not equal to the intermediate value between $P_{max}$ and $P_{min}$. That is, although the mirror surface portion and the pit portion are equally irradiated by the light spot since the reflection light by the reading beam spot YS is on the edge portion of the pit, as shown in FIG. 4B, the side spot SS traces the mirror surface portion. The read sampling value $R_b$ is, consequently, larger than the intermediate value by an amount of 50% of the leakage light by the side spot SS. That is, an error of the positive polarity occurs for the intermediate value.

On the other hand, when the tangential skew in the negative direction occurs, as shown in FIG. 4C, the side spot SS exists at a position before the reading beam spot YS by the distance of Lt.

In a manner similar to the case of FIG. 4B, therefore, the level of the read signal obtained when both of the reading beam spot YS and side spot SS trace the mirror surface portion is equal to $P_{max}$ and the level of the read signal obtained when both of them trace the pit is equal to $P_{min}$.

In this case, as shown in FIG. 4C, a read sampling value $R_c$ obtained when the reading beam spot YS traces the edge portion of the pit is not equal to the intermediate value between $P_{max}$ and $P_{min}$. That is, since the reflection light by the reading beam spot YS is on the edge portion of the pit, the mirror surface portion and the pit portion are equally irradiated. As shown in FIG. 4C, however, the side spot SS traces the pit, the leakage light by the side spot SS is equal to zero. The read sampling value $R_c$ is, consequently, smaller than the intermediate value by an amount of 50% of the leakage light obtained when the side spot SS traces the mirror surface portion. That is, an error of the negative polarity occurs for the intermediate value.

As mentioned above, when the tangential skew occurs between the optical disc 1 and pickup 3, the read sampling value $R_b$ or $R_c$ having the error as shown in FIG. 4B or 4C exists in the read sample sequence (R). Further, as shown in FIG. 4B or 4C, the position which is behind the position on the optical disc 1 where the read sampling value $R_b$ or $R_c$ having the error is obtained by the distance of Lt corresponds to the mirror surface portion and when the pit exists at the position which is preceding by the distance of Lt, the polarity of the error shows the direction of the tangential skew.

For example, when the tangential skew in the positive direction occurs, as shown in FIG. 4B, the read sampling value $R_b$ having the error of the positive polarity for the intermediate value is obtained. When the tangential skew in the negative direction occurs, as shown in FIG. 4C, the read sampling value $R_c$ having the error of the negative polarity for the intermediate value is obtained.

That is, the read sampling value having the error as mentioned above is obtained from the read sampling value (R). Further, in the case where the read sampling value obtained at the time point that is preceding to the time point when the read sampling value having the error is obtained by a value of $(Lt/V_L)$ corresponds to "1" and the read sampling value obtained at the time point that is subsequent to the time point when the read sampling value having the error is obtained by a value of $(Lt/V_L)$ corresponds to "−1", the direction of the tangential skew can be detected on the basis of the polarity of the error.

On the contrary to the above conditions, in the case where the read sampling value obtained at the time point which is preceding to the time point when the read sampling value having the error is obtained by a value of $(Lt/V_L)$ corresponds to "−1" and the read sampling value obtained at the time point which is subsequent to the time point when the read sampling value having the error is obtained by a value of $(Lt/V_L)$ corresponds to "1", the reference values for discrimination about the direction of the tangential skew are opposite.

That is, in this case, when the polarity of the error is positive, it is determined that the tangential skew in the negative direction occurs. When the polarity of the error is negative, it is decided that the tangential skew in the positive direction occurs.

As mentioned above, the read sampling value having the error as mentioned above is obtained from the read sampling value (R). Further, in the case where the polarity of the read sampling value obtained at the time point which is preceding to the time point when the read sampling value having the error is obtained by a value of $(Lt/V_L)$ and the polarity of the read sampling value obtained at the time point which is subsequent to the time point when the read sampling value having the error is obtained by a value of $(Lt/V_L)$ are different, the direction of the tangential skew can be detected on the basis of the polarity of the error. FIG. 5 is a diagram showing an example of an internal construction of the skew detecting apparatus 8 for detecting a skew on the basis of the above-mentioned detection principle of the tangential skew. In the embodiment shown in FIG. 5, it is presumed that the numerical aperture NA of the objective lens of the pickup 3 is equal to 0.55, the wavelength λ of the reading beam is equal to 0.635 [μm], $V_L/f_s$=0.17 [μm], and Lt=0.8 (λ/NA).

In FIG. 5, the read sample sequence (R) as a discrete signal supplied from the FIR filter 6 is transmitted to a system consisting of ten unit delay elements $D_1$ to $D_{10}$ which are cascade connected. Each of the unit delay elements $D_1$ to $D_{10}$ gives a time delay equal to one sampling period of the read sample sequence (R).

When it is presumed that a read sampling value at a time point $T_0$ in the read sample sequence (R) is generated from the unit delay element $D_5$, the read sampling value at a time point $T_{-5}$ which is preceding to the time point $T_0$ by a time of five sampling periods is generated from the unit delay element $D_{10}$. It will be understood that the read sampling value in the read sample sequence (R) supplied to the unit delay element $D_1$ is a sampling value at a time point $T_5$ which is subsequent to the time point $T_0$ by a time of five sampling periods.

In this case, the unit delay elements $D_1$ to $D_5$ shown in FIG. 5 form first delay means and the unit delay element $D_6$ to $D_{10}$ form second delay means. The number of stages of the unit delay elements is set to five so that each means has a delay of $(Lt/V_L)$.

An error detecting circuit 70 discriminates that an output value of the unit delay element $D_5$ is closest to which one of a plurality of prediction values and supplies a difference between the closest prediction value and the output value from the unit delay element $D_5$ as an error value G to each of multipliers 81 and 82. As mentioned above, the partial response transmitting system class I is presumed in the recording and reproducing system in the embodiment. In this case, if an ideal value which can be obtained as each sample in the read sample sequence (R) is set to any one of three values of "1", "0", and "−1", those values will be the prediction values.

The multiplier 81 supplies a multiplication result obtained by multiplying the read sample sequence (R) by the error value (G) to a subtractor 83. The multiplier 82 supplies a multiplication result obtained by multiplying an output value of the unit delay element $D_{10}$ by the error value (G) to the subtractor 83. The subtractor 83 supplies a value obtained by subtracting the multiplication result by the multiplier 81 from the multiplication result by the multiplier 82 to an averaging circuit 84. The averaging circuit 84 obtains a value corresponding to the average of the substraction values and outputs it as a skew detection signal (e).

As mentioned above, in the skew detecting apparatus 8 shown in FIG. 5, the error value (G), the read sampling value obtained at the time point (time point $T_{-5}$) which is preceding to the time point when the error value (G) is obtained by a value of $(Lt/V_L)$, and the read sampling value obtained at the time point (time point $T_5$) which is subsequent to the time point by a value of $(Lt/V_L)$ are extracted from the read sample sequence (R), respectively. By executing a subtraction between values obtained by multiplying the extracted read sampling values by the error value (G), the skew detection signal (e) having the polarity corresponding to the direction of the tangential skew is obtained.

Figures 6A, 6B:
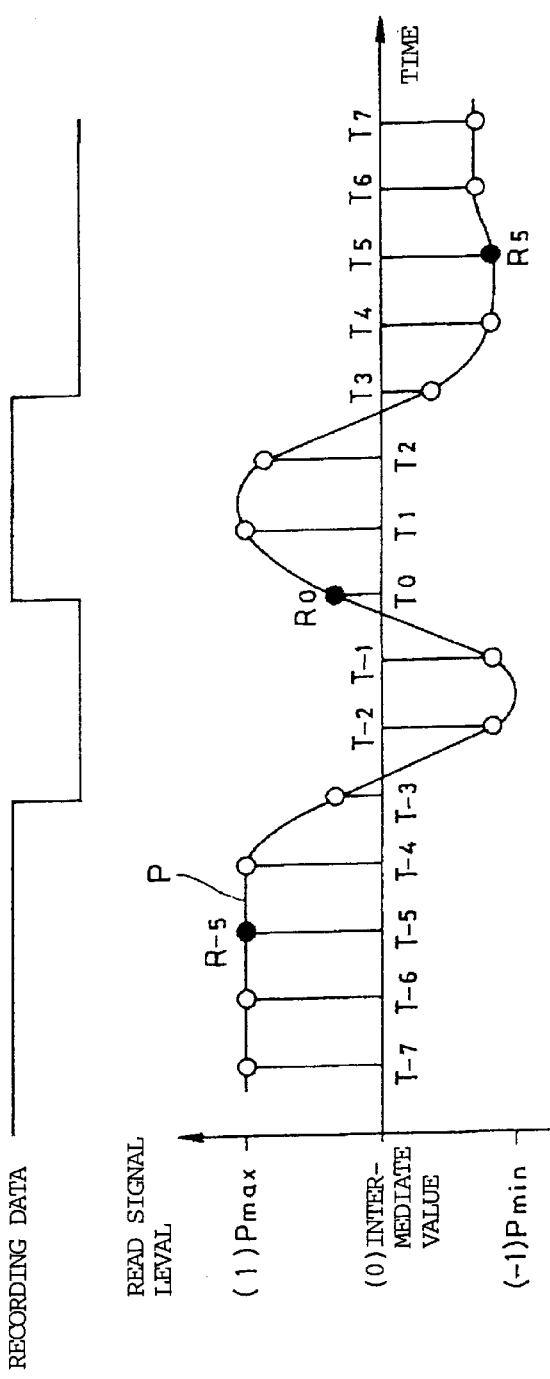
FIGS. 6A and 6B are diagrams showing an example of a read signal (p) and a read sample (R) obtained when a tangential skew in the positive direction occurs.

For example, when it is assumed that a recording data train of the disc is as shown in FIG. 6A, and if the skew of the positive polarity occurs in this instance, the read sample sequence (R) obtained by sampling the read signal (P) has a format shown in FIG. 6B. The error value (G) of a read sampling value $R_0$ obtained at the time point $T_0$ has the positive polarity for the polarity of the intermediate value. Therefore, when a value obtained by multiplying the error value (G) by a read sampling value $R_5$ of the negative polarity derived at the time point $T_5$ is subtracted from a value obtained by multiplying the error value (G) of the positive polarity by a read sampling value $R_{-5}$ of the positive polarity obtained at the time point $T_{-5}$, the skew detection signal (e) of the positive polarity can be obtained. That is, a situation such that the tangential skew in the positive direction occurs can be detected.

When the values of "1" and "0" of the recording data shown in FIG. 6A are opposite, $R_0$ and $R_{-5}$ are negative and $R_5$ is positive. An output obtained by the subtraction, consequently, similarly becomes the skew detection signal (e) of the positive polarity.

Further, in the case where the skew of the negative polarity occurs in the recording data shown in FIG. 6A, since $R_0$ is negative, the output derived by the subtraction has the negative polarity. In a manner similar to the above, when the values of "1" and "0" of the recording data shown in FIG. 6A are opposite, the output derived by the subtraction also has the negative polarity.

In the embodiment, when it is assumed that the position where the side lobe Sr occurs is $$Lt = \pm 0.8 \cdot (\lambda/NA),$$

it is designed so that a delay time of each of the first delay means consisting of the unit delay elements $D_1$ to $D_5$ and the second delay means consisting of the unit delay elements $D_6$ to $D_{10}$ is equal to $$0.8 \cdot (\lambda/NA)/V_L.$$

As shown in FIG. 3, however, the position where the side lobe Sr occurs has a width as shown by a range of $$-0.6 \cdot (\lambda/NA) \sim -1.0 \cdot (\lambda/NA)$$

or $$0.6 \cdot (\lambda/NA) \sim 1.0 \cdot (\lambda/NA).$$

In short, it is sufficient to set a delay time DD of each of the first and second delay means so as to satisfy the following relations.

$$\{0.6 \cdot (\lambda/NA)/V_L\} < DD < \{1.0 \cdot (\lambda/NA)/V_L\}$$

Although the detection only by using the sampling value at one point (two points when values of + and − are considered) of $0.8 \cdot (\lambda/NA)/V_L$ has been shown in the example, the number of sampling values is not limited to one. For example, the sum of the sampling values at two points, for example, $\{0.6 \cdot (\lambda/NA)/V_L\}$ and $\{0.7 \cdot (\lambda/NA)/V_L\}$ can be also obtained so long as they are included in the above range.

When the tangential skew occurs, as shown in FIGS. 3A and 3B, the light intensity rises in the beam profile not only at the position where the side lobe Sr occurs but also at a position in a range from $-0.3 \cdot (\lambda/NA)$ to $-0.6 \cdot (\lambda/NA)$ or a range from $0.3 \cdot (\lambda/NA)$ to $0.6 \cdot (\lambda/NA)$.

That is, as shown in FIGS. 3A and 3B, in the case where the tangential skew in the positive direction occurs, the light intensity in the range from $0.3 \cdot (\lambda/NA)$ to $0.6 \cdot (\lambda/NA)$ is larger than the light intensity in the range from $-0.3 \cdot (\lambda/NA)$ to $-0.6 \cdot (\lambda/NA)$. When the tangential skew in the negative direction occurs, the light intensity in the range from $-0.3 \cdot (\lambda/NA)$ to $-0.6 \cdot (\lambda/NA)$ is larger than the light intensity in the range from $0.3 \cdot (\lambda/NA)$ to $0.6 \cdot (\lambda/NA)$.

In this case, the error corresponding to the direction of the tangential skew as shown in FIG. 4B or 4C occurs in the read sample sequence (R) also by the increase in light intensity.

Figure 7:
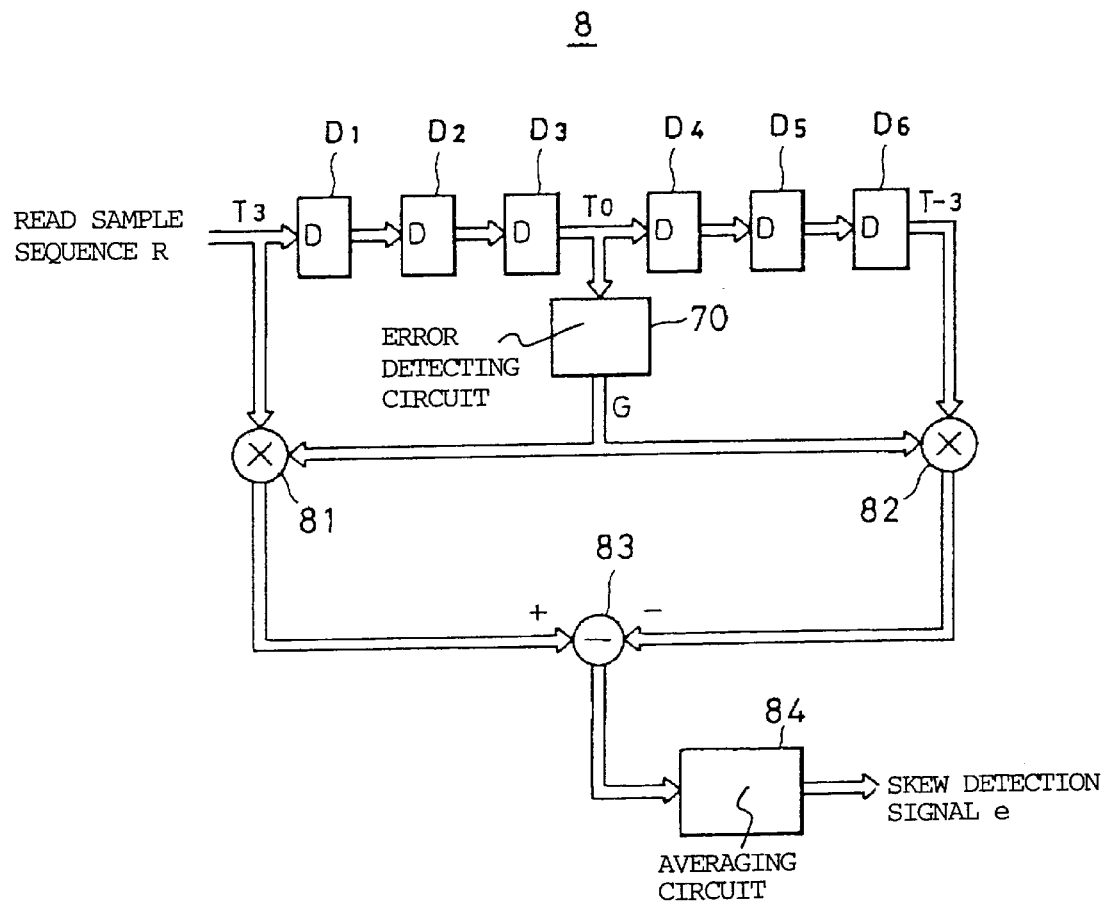
FIG. 7 is a diagram showing a circuit construction of the skew detecting apparatus 8 according to another embodiment of the invention.

Consequently, the skew detecting apparatus 8 having a construction as shown in FIG. 7 in which the delay time DD of each of the first and second delaying means is set so as to satisfy the following relations $$\{0.3 \cdot (\lambda/NA)/V_L\} < DD < \{0.6 \cdot (\lambda/NA)/V_L\}$$

can be also used.

In FIG. 7, the read sample sequence (R) as a discrete signal which is supplied from the FIR filter 6 is transmitted to the system comprising six unit delay elements $D_1$ to $D_6$ which are cascade connected. Each of the unit delay elements $D_1$ to $D_6$ gives a delay time which is equal to one sampling period of the read sample sequence (R). In this instance, the first delay means is formed by the unit delay elements $D_1$ to $D_3$. The second delay means is formed by the unit delay elements $D_4$ to $D_6$. The error detecting circuit 70 discriminates that an output value of the unit delay element $D_3$ is closest to which one of a plurality of prediction values. The error detecting circuit 70 supplies a difference between the prediction value having the closest value and output value from the unit delay element $D_3$ as an error value (G) to the multiplier 81.

The multiplier 81 supplies a multiplication result obtained by multiplying the read sample sequence (R) by the error value (G) to the subtractor 83. The multiplier 82 supplies a multiplication result obtained by multiplying an output value of the unit delay element $D_6$ by the error value (G) to the subtractor 83. The subtractor 83 supplies a value obtained by subtracting the multiplication result by the multiplier 81 from the multiplication result by the multiplier 82 to the averaging circuit 84. The averaging circuit 84 obtains a value corresponding to the average of the subtraction values and outputs it as a skew detection signal (e).

Figure 8:
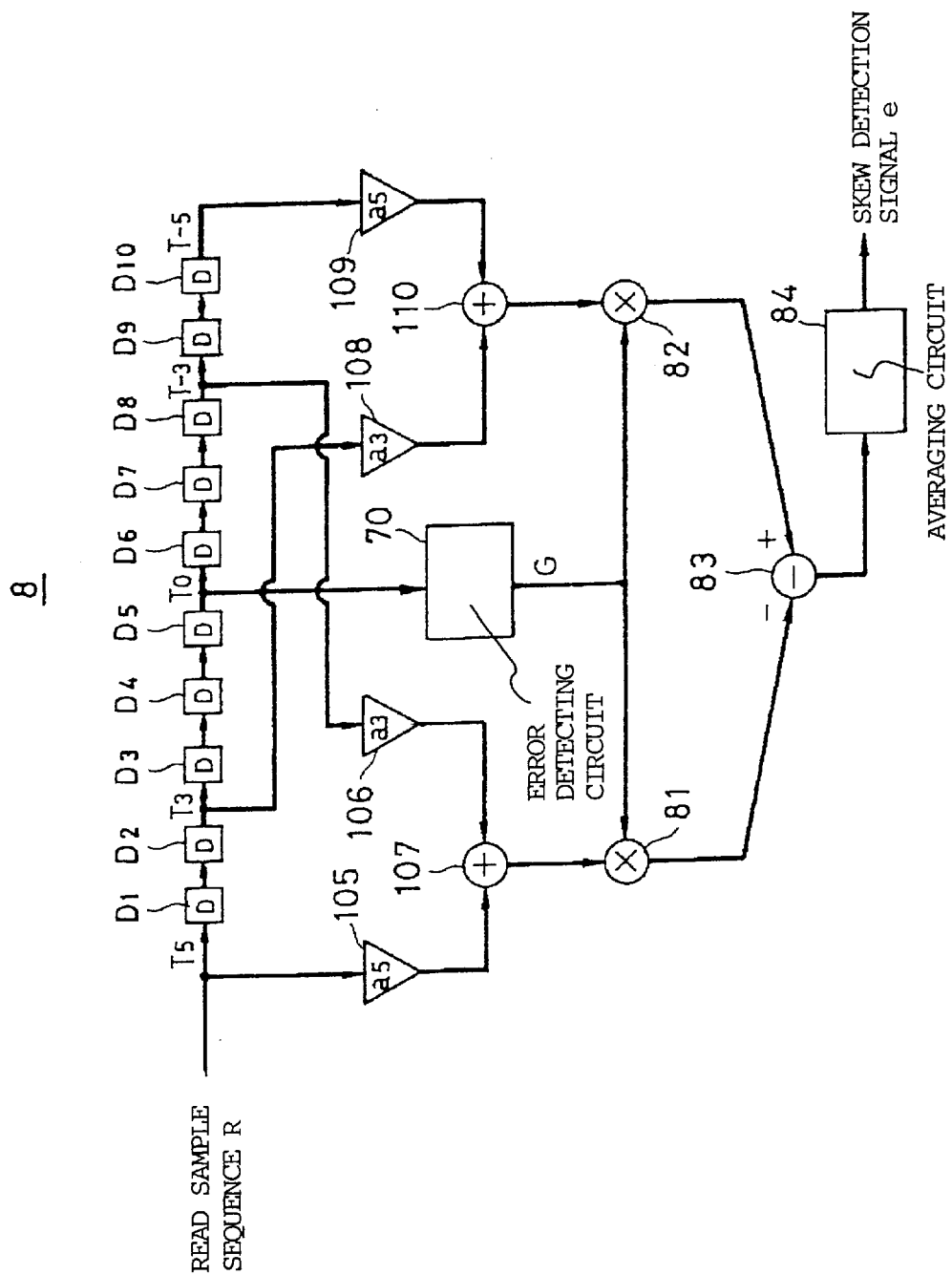
FIG. 8 is a diagram showing a circuit construction of the skew detecting apparatus 8 according to still another embodiment of the invention.

The skew detecting apparatus 8 can also use a construction as shown in FIG. 8 obtained by combining the constructions shown in FIGS. 5 and 7.

In FIG. 8, the read sample sequence (R) as a discrete signal supplied from the FIR filter 6 is supplied to the system comprising the ten unit delay elements $D_1$ to $D_{10}$ which are cascade connected. Each of the unit delay elements $D_1$ to $D_{10}$ gives a delay time which is equal to one sampling period of the read sample sequence (R). A coefficient multiplier 105 supplies a multiplication result obtained by multiplying the read sample sequence (R) by a predetermined first weight coefficient to an adder 107. A coefficient multiplier 108 multiplies a value in which the read sample sequence (R) is delayed by the first delay means comprising the unit delay elements $D_1$ and $D_2$ by a predetermined third weight coefficient and supplies a multiplication result derived to an adder 110.

The error detecting circuit 70 discriminates that a value obtained by delaying the read sample sequence (R) by the first delay means comprising the unit delay elements $D_1$ and $D_2$ and by further delaying by the second delay means comprising the unit delay elements $D_3$ to $D_5$ is closest to which one of a plurality of prediction values. The error detecting circuit 70 supplies a difference between the prediction value having the closest value and the output value from the unit delay element $D_5$ as an error value (G) to each of the multipliers 81 and 82.

A coefficient multiplier 106 multiplies a value in which a value delayed by the second delay means comprising the unit delay elements $D_3$ to $D_5$ is further delayed by third delay means comprising the unit delay elements $D_6$ to $D_8$ by a predetermined second weight coefficient and supplies a multiplication result derived to the adder 107. The adder 107 supplies an addition result obtained by adding the multiplication results supplied from the coefficient multipliers 105 and 106 to the multiplier 81.

A coefficient multiplier 109 multiplies a value in which a value delayed by the third delay means comprising the unit delay elements $D_6$ to $D_8$ is further delayed by fourth delay means comprising the unit delay elements $D_9$ and $D_{10}$ by a predetermined fourth weight coefficient and supplies a multiplication result derived to the adder 110. The adder 110 supplies an addition result obtained by adding the multiplication results supplied from the coefficient multipliers 108 and 109 to the multiplier 82.

The multiplier 81 supplies a multiplication result obtained by multiplying a value from the adder 107 by the error value (G) to the subtractor 83. The multiplier 82 supplies a multiplication result obtained by multiplying a value from the adder 110 by the error value (G) to the subtractor 83. The subtractor 83 supplies a value obtained by subtracting the multiplication result by the multiplier 81 from the multiplication result by the multiplier 82 to the averaging circuit 84. The averaging circuit 84 obtains an average value of the subtraction values and outputs the mean value as a skew detection signal (e).

It is sufficient to set a delay time DD1 of each of the first and fourth delay means so as to satisfy the following relations.

$$\{0.3 \cdot (\lambda/NA)/V_L\} < DD1 < \{0.6 \cdot (\lambda/NA)/V_L\}$$

It is sufficient to set a delay time DD2 of each of the second and third delay means so as to satisfy the following relations.

$$\{0.3 \cdot (\lambda/NA)/V_L\} < DD2 < \{0.4 \cdot (\lambda/NA)/V_L\}$$

Figure 9:
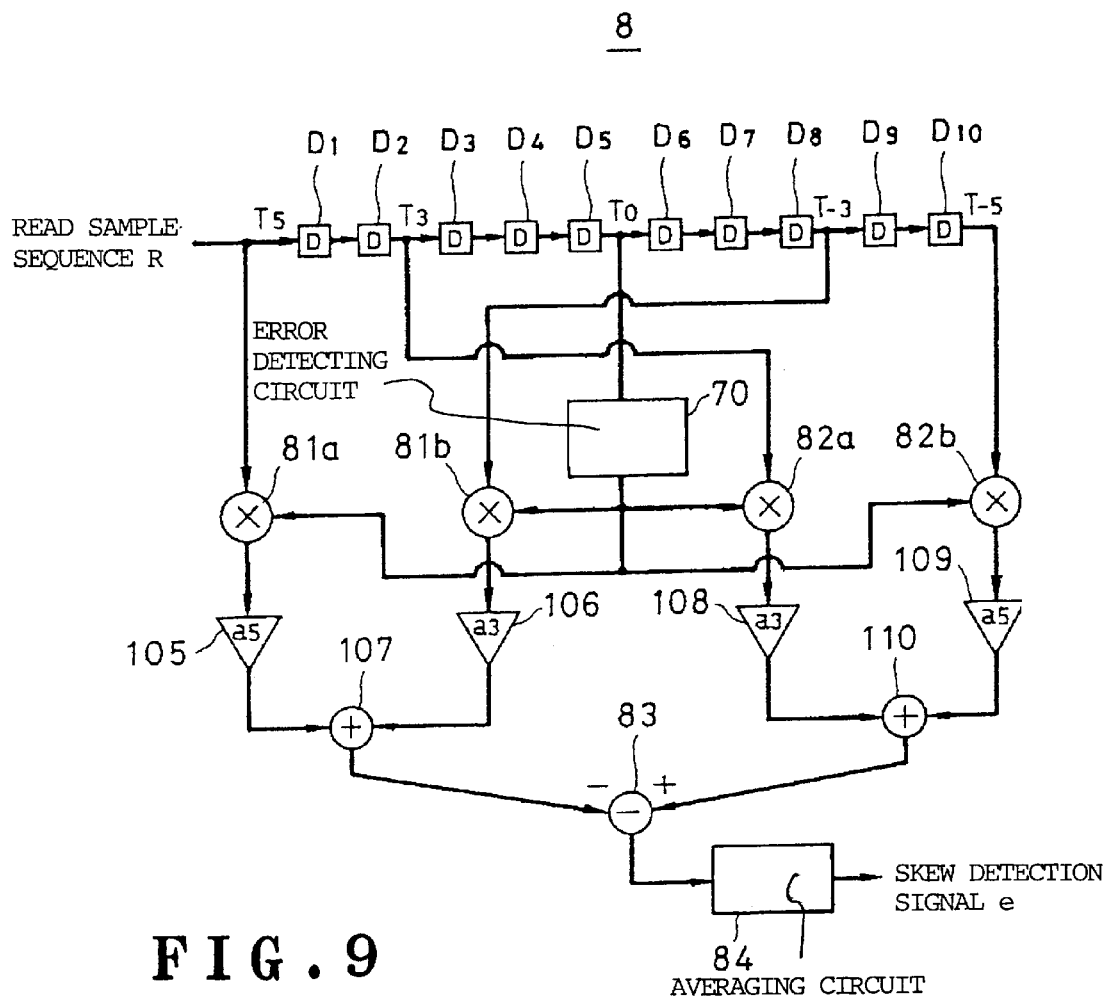
FIG. 9 is a diagram showing a circuit construction of the skew detecting apparatus 8 according to further another embodiment of the invention.
Figure 10:
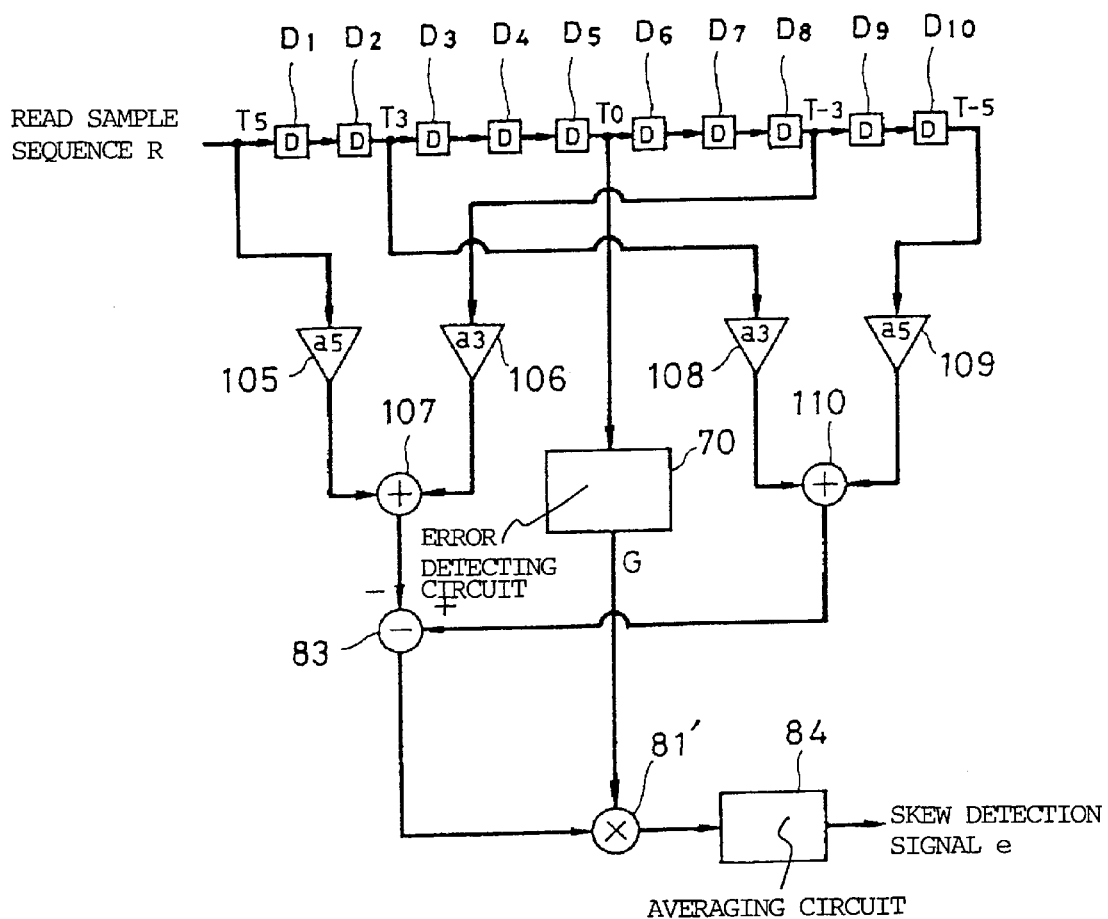
FIG. 10 is a diagram showing a circuit construction of the skew detecting apparatus 8 according to further another embodiment of the invention.

The circuit construction shown in FIG. 8 can be also modified to a circuit construction as shown in FIG. 9 or 10. In FIGS. 9 and 10, the blocks having the same functions as those of the functional blocks shown in FIG. 8 are designated by the same reference numerals.

The error detecting circuit 70 in each of FIGS. 5 and 7 to 10 can be also replaced with a zero-cross sample extracting circuit.

Figure 11:
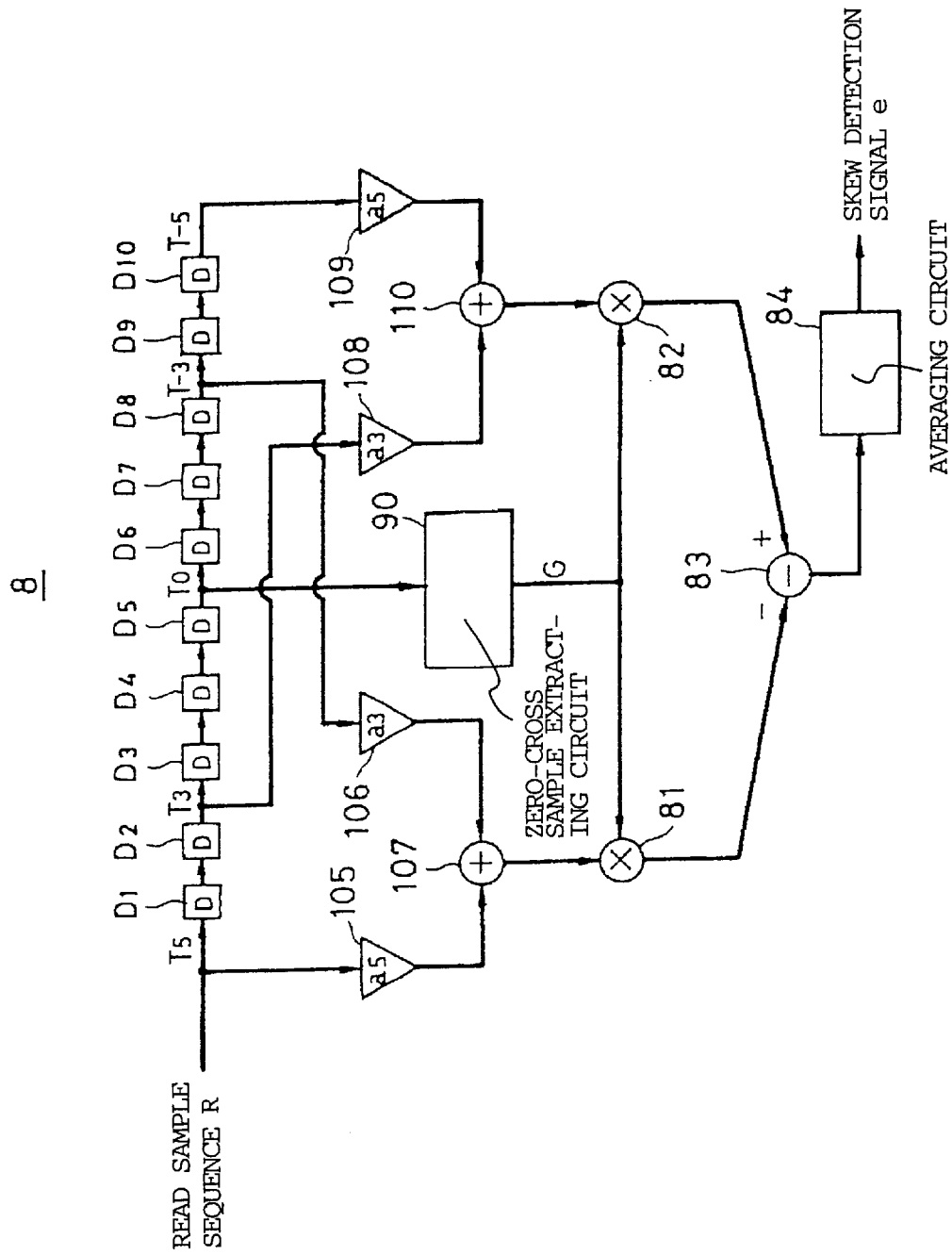
FIG. 11 is a diagram showing a circuit construction of the skew detecting apparatus 8 according to further another embodiment of the invention.

FIG. 11 is a diagram showing an example of an internal construction of the skew detecting apparatus 8 constructed by replacing the error detecting circuit 70 in the construction shown in FIG. 8 with a zero-cross sample extracting circuit 90.

In FIG. 11, the zero-cross sample extracting circuit 90 extracts a sample existing at a position that is closest to a zero-crossing point when the polarity of the read sampling value changes from the positive polarity to the negative polarity or from the negative polarity to the positive polarity, namely, a zero-cross sample from the output sequence of the unit delay element $D_5$. For example, in FIG. 6 mentioned above, the read sampling value at each of time points $T_{-3}$, $T_0$, and $T_3$ is extracted as a zero-cross sample from the output sequence of the unit delay element $D_5$. The zero-cross sample extracting circuit 90 supplies the extracted zero-cross sampling value itself as an error value (G) to each of the multipliers 81 and 82.

That is, in the skew detecting apparatus 8 using the zero-cross sample extracting circuit 90 in place of the error detecting circuit 70, the skew is detected at only the zero-cross sampling time point in the read sample sequence. According to the construction, a tangential skew can be detected with a higher reliability.

Figure 12:
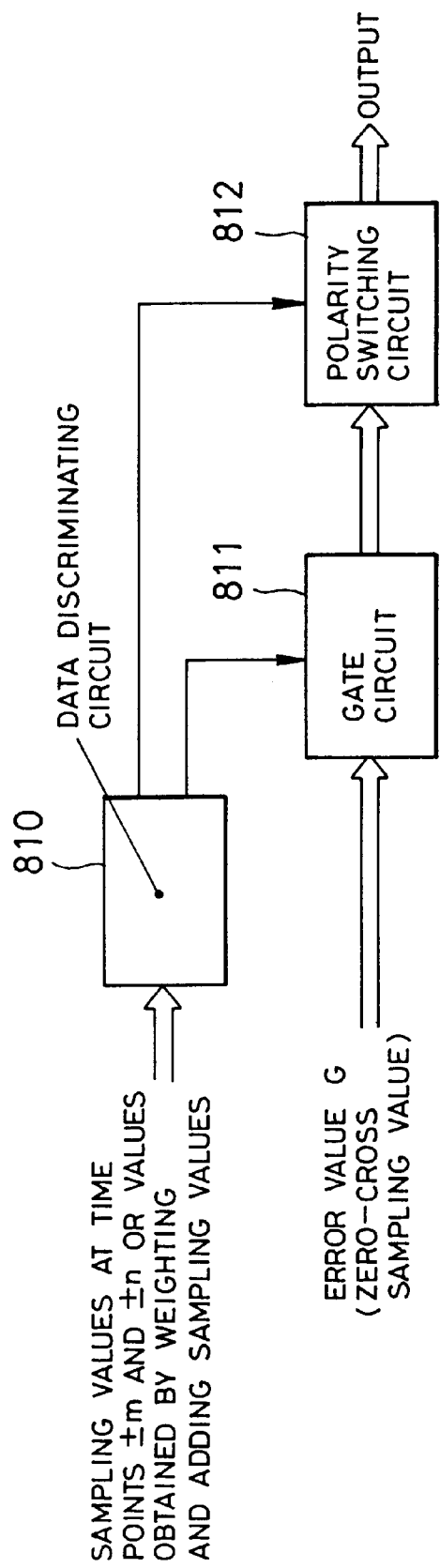
FIG. 12 is a diagram showing another construction of multipliers 81 and 82.

Each of the multipliers 81 and 82 shown in each of FIGS. 5 and 7 to 11 can be also replaced with a circuit as shown in FIG. 12.

For example, in the case of using the circuit shown in FIG. 12 in place of the multiplier 81 shown in FIG. 11, a data discriminating circuit 810 in FIG. 12 discriminates that a value which was weighted and added by the adder 107 in FIG. 11 corresponds to any one of the data of "1", "0", and "−1". When it is determined that the value is other than "0", the data discriminating circuit 81 supplies an enable signal of a logic value "1" to a gate circuit 811. When it is determined to be "0", an enable signal of a logic value "0" is supplied. Further, when the value which was weighted and added by the adder 107 in FIG. 11 is equal to "−1", the data discriminating circuit 810 supplies a polarity inversion signal of a logic value "1" to a polarity switching circuit 812. In the case of a value other than "−1", a polarity inversion signal of a logic value "0" is supplied to the polarity switching circuit 812. Only when the enable signal of a logic value "1" is supplied from the data discriminating circuit 810, the gate circuit 811 supplies the error value (G) as a zero-cross sampling value supplied from the zero-cross sample extracting circuit 90 to the polarity switching circuit 812. When the polarity inversion signal of a logic value "1" is supplied from the data discriminating circuit 810, the polarity switching circuit 812 generates a value in which the polarity of the error value (G) supplied from the gate circuit 811 is inverted as a multiplication result. When the polarity inversion signal of a logic value "0" is supplied from the data discriminating circuit 810, the polarity switching circuit 812 outputs the error value (G) supplied from the gate circuit 811 as a multiplication result as it is.

By using the circuit shown in FIG. 12 in place of the multipliers 81 and 82 as mentioned above, its circuit scale is reduced.

Figure 13:
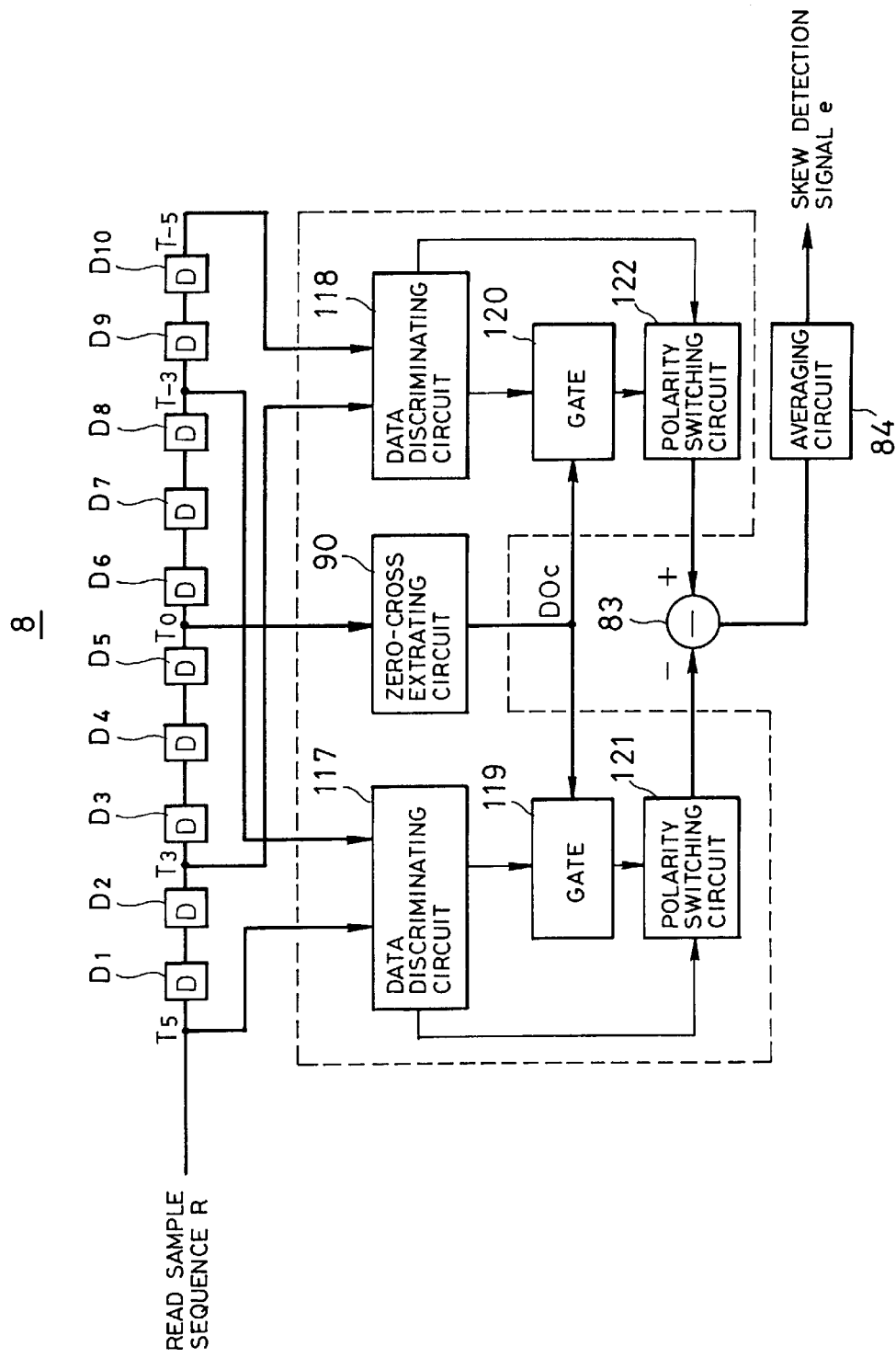
FIG. 13 is a diagram showing a circuit construction of the skew detecting apparatus 8 according to further another embodiment of the invention.

FIG. 13 is a diagram showing an internal construction of the skew detecting apparatus 8 according to another embodiment of the invention.

In FIG. 13, the read sample sequence (R) serving as a discrete signal supplied from the FIR filter 6 is transmitted to the system comprising ten unit delay elements $D_1$ to $D_{10}$ which are cascade connected. Each of the unit delay elements $D_1$ to $D_{10}$ gives a delay time which is equal to one sampling period of the read sample sequence (R).

Now, assuming that the read sampling value at a time point $T_0$ in the read sample sequence (R) is generated from the unit delay element $D_5$, therefore, the read sampling value at the time point $T_{-5}$ which is preceding to the time point $T_0$ by only a value of five sampling periods is generated from the unit delay element $D_{10}$. It will be understood that the read sampling value in the read sample sequence (R) supplied to the unit delay time $D_1$ is the sampling value at the time point $T_5$ which is subsequent to the time point $T_0$ by a value of five sampling periods.

A data discriminating circuit 117 supplies an enable signal of a logic value "1" to a gate circuit 119 when it is determined that both of the absolute values of the values generated from the read sample sequence (R) and unit delay element $D_8$ are equal to or larger than a predetermined value, namely, a value other than "0" and that the polarities of the values generated from the read sample sequence (R) and unit delay element $D_8$ are the same. In the other cases, the data discriminating circuit 117 supplies an enable signal of a logic value "0" to the gate circuit 119. The data discriminating circuit 117 further supplies a polarity inversion signal having a logic value corresponding to the polarity of the read sample sequence (R) to a polarity switching circuit 121. For example, when the polarity of the read sample sequence (R) is positive, the data discriminating circuit 117 supplies a polarity inversion signal of a logic value "1" to the polarity switching circuit 121. On the other hand, when the polarity of the read sample sequence (R) is negative, the data discriminating circuit 117 supplies a polarity inversion signal of a logic value "0" to the polarity switching circuit 121.

A data discriminating circuit 118 supplies an enable signal of a logic value "1" to a gate circuit 120 when it is determined that both of the absolute values of the value generated from the unit delay element $D_3$ and the value generated from the unit delay element $D_{10}$ are equal to or larger than a predetermined value, namely, a value other than "0" and that the polarities of the value generated from the unit delay element $D_3$ and the value generated from the unit delay element $D_8$ are the same. In the other cases, the data discriminating circuit 118 supplies an enable signal of a logic value "0" to the gate circuit 120. The data discriminating circuit 118 further supplies a polarity inversion signal having a logic value corresponding to the polarity of the value generated from the unit delay element $D_{10}$ to a polarity switching circuit 122. For example, when the polarity of the value generated from the unit delay element $D_{10}$ is positive, the data discriminating circuit 118 supplies a polarity inversion signal of a logic value "1" to the polarity switching circuit 122. When the polarity of the value generated from the unit delay element $D_{10}$ is negative, the data discriminating circuit 118 supplies a polarity inversion signal of a logic value "0" to the polarity switching circuit 122.

The zero-cross sample extracting circuit 90 extracts a sample existing at a position that is closest to a zero-cross time point when the polarity of the read sampling value changes from the positive polarity to the negative polarity or from the negative polarity to the positive polarity from the output sequence of the unit delay element $D_5$, namely, extracts a zero-cross sample and supplies it as an error value (G) to each of the gate circuits 119 and 120.

Only when the enable signal of a logic value of "1" is supplied from the data discriminating circuit 117, the gate circuit 119 transmits the error value (G) as a zero-cross sampling value supplied from the zero-cross sample extracting circuit 90 to the polarity switching circuit 121. When the polarity inversion signal of the logic value "1" is supplied from the data discriminating circuit 117, the polarity switching circuit 121 transmits a value in which the polarity of the error value (G) supplied from the gate circuit 119 is inverted to the subtractor 83. When the polarity inversion signal of a logic value "0" is supplied from the data discriminating circuit 117, the polarity switching circuit 121 transmits the error value (G) supplied from the gate circuit 119 to the subtractor 83 as it is.

Only when the enable signal of a logic value "1" is supplied from the data discriminating circuit 118, the gate circuit 120 transmits the error value (G) as a zero-cross sampling value supplied from the zero-cross sample extracting circuit 90 to the polarity switching circuit 122. When the polarity inversion signal of a logic value "1" is supplied from the data discriminating circuit 118, the polarity switching circuit 122 transmits a value in which the polarity of the error value (G) supplied from the gate circuit 120 is inverted to the subtractor 83. When the polarity inversion signal of a logic value "0" is supplied from the data discriminating circuit 120, the polarity switching circuit 122 transmits the error value (G) supplied from the gate circuit 120 to the subtractor 83 as it is.

The subtractor 83 subtracts the value supplied from the polarity switching circuit 121 from the value supplied from the polarity switching circuit 122 and transmits a resultant value to the averaging circuit 84. The averaging circuit 84 obtains an average value of the subtraction values and outputs it as a skew detection signal (e).

Figure 14:
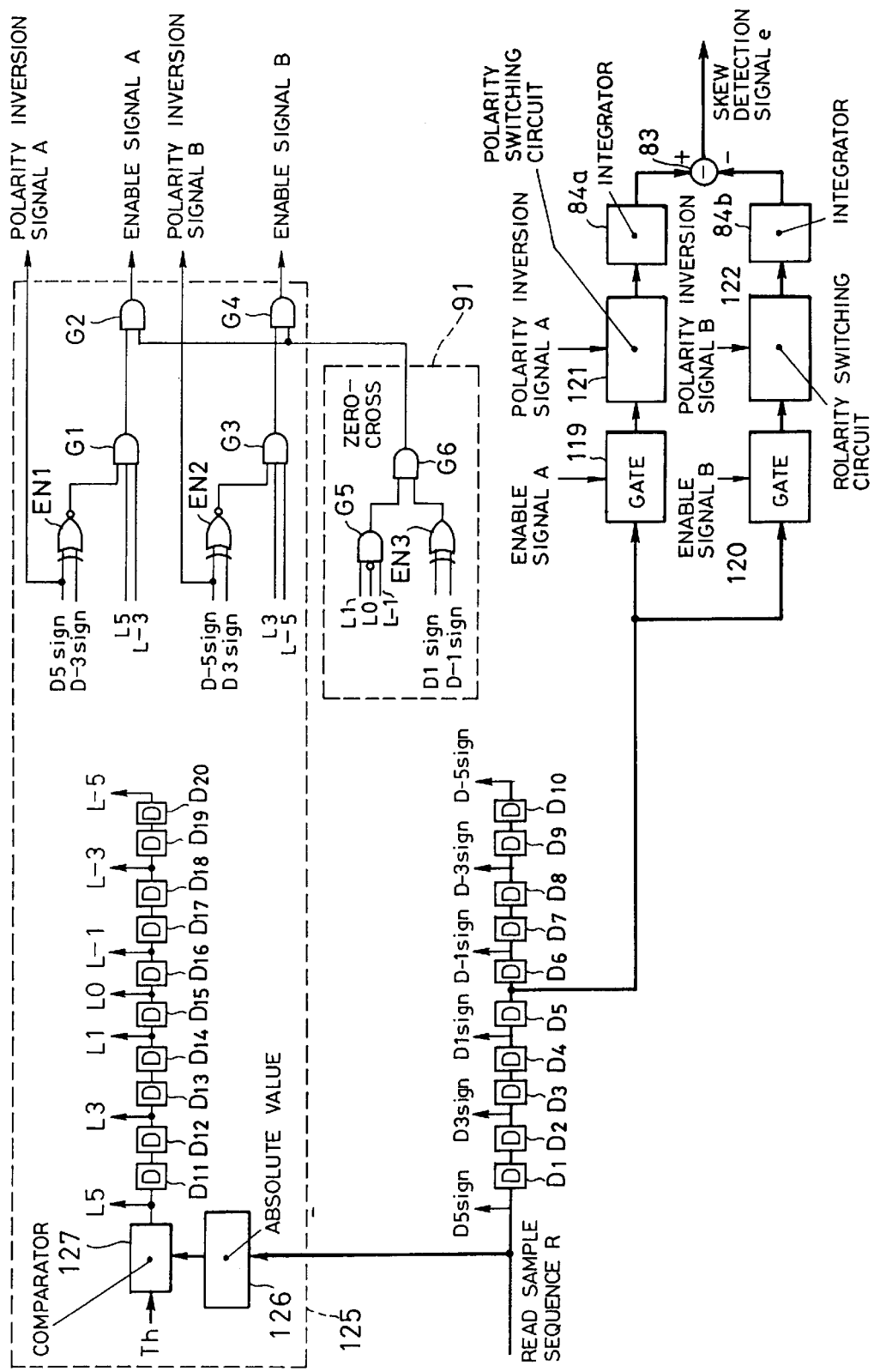
FIG. 14 is a diagram showing a circuit construction of the skew detecting apparatus 8 according to further another embodiment of the invention.

FIG. 14 is a diagram showing an example of a modification of the construction shown in FIG. 13.

In FIG. 14, the read sample sequence (R) as a discrete signal supplied from the FIR filter 6 is transmitted to a serial delay circuit composed of the ten unit delay elements $D_1$ to $D_{10}$ which are cascade connected and to a data discriminating circuit 125, respectively. Each of the unit delay elements $D_1$ to $D_{10}$ gives a delay time which is equal to one sampling period of the read sample sequence (R).

The data discriminating circuit 125 is made up of an absolute value circuit 126, a comparator 127, unit delay elements $D_{11}$ to $D_{20}$, AND gates G1 to G4, and EXNOR gates EN1 and EN2.

The absolute value circuit 126 and comparator 127 supply a value in which the absolute value of each read sample in the read sample sequence (R) is equal to or larger than a predetermined value Th to the unit delay element $D_{11}$. That is, in the case of a value other than "0", the signal of a logic value "1" is supplied. When the absolute value of each read sample is smaller than the predetermined value Th, a signal of a logic value "0" is supplied. Each of the ten unit delay elements $D_{11}$ to $D_{20}$ which are cascade connected gives a delay time that is equal to one sampling period of the read sample sequence (R). A signal of one bit which is sequentially supplied from the comparator 127 is fetched from the unit delay element $D_{11}$ and is sequentially shifted to the unit delay element $D_{20}$.

A circuit comprising the AND gates G1 and G2 and EXNOR gate EN1 supplies an enable signal A of a logic value "1" to the gate circuit 119 in the case where both of a signal generated from the comparator 127 and a signal generated from the unit delay element $D_{18}$ are logical "1" and both of a sign bit of each read sample in the read sample sequence (R) and a sign bit of the value generated from the unit delay element $D_8$ are of the same logic value and, further, a zero-cross detection signal of a logic value "1" is supplied from a zero-cross detecting circuit, which will be explained later.

A circuit comprising the AND gates G3 and G4 and EXNOR gate EN2 supplies an enable signal B of a logic value "1" to the gate circuit 120 in the case where both of a signal generated from the unit delay element $D_{12}$ and a signal generated from the unit delay element $D_{20}$ are logical "1" and both of a sign bit of a value generated from the unit delay element $D_2$ and a sign bit of a value generated from the unit delay element $D_{10}$ are of the same logic value and, further, a zero-cross detection signal of a logic value "1" is supplied from the zero-cross detecting circuit, which will be explained later.

A zero-cross detecting circuit 91 is made up of AND gates G5 and G6 and an EXNOR gate EN3. With the above construction, the zero-cross detecting circuit 91 generates a zero-cross detection signal of a logic value "1" and supplies it to each of the AND gates G2 and G4 when logic values of signals generated from the unit delay elements $D_{14}$ to $D_{16}$ are "1", "0", and "1" and both of sign bits of values generated from the unit delay elements $D_4$ and $D_6$ are of the same logic value.

The gate circuit 119 supplies the value generated from the unit delay element $D_5$ to the polarity switching circuit 121 only when the enable signal A of a logic value "1" is supplied from the data discriminating circuit 125. When the polarity inversion signal A of a logic value "1" is supplied from the data discriminating circuit 125, the polarity switching circuit 121 transmits a value in which the polarity of the value supplied from the gate circuit 119 is inverted to an integrator 84a. When the polarity inversion signal A of a logic value "0" is supplied from the data discriminating circuit 125, the polarity switching circuit 121 transmits the value supplied from the gate circuit 119 to the integrator 84a as it is. The integrator 84a obtains an average of the values supplied from the polarity switching circuit 121 and sends it to the subtractor 83.

The gate circuit 120 supplies the value generated from the unit delay element $D_5$ to the polarity switching circuit 122 only when the enable signal B of a logic value "1" is supplied from the data discriminating circuit 125. When the polarity inversion signal B of a logic value "1" is supplied from the data discriminating circuit 125, the polarity switching circuit 122 transmits a value in which the polarity of the value supplied from the gate circuit 120 is inverted to an integrator 84b. When a polarity inversion signal B of a logic value is supplied from the data discriminating circuit 125, the polarity switching circuit 122 transmits the value supplied from the gate circuit 120 to the integrator 84b as it is. The integrator 84b obtains an average of the values supplied from the polarity switching circuit 122 and sends it to the subtractor 83.

The subtractor 83 subtracts a value supplied from the integrator 84b from a value supplied from the integrator 84a and outputs a resultant value as a skew detection signal (e).

Figure 15:
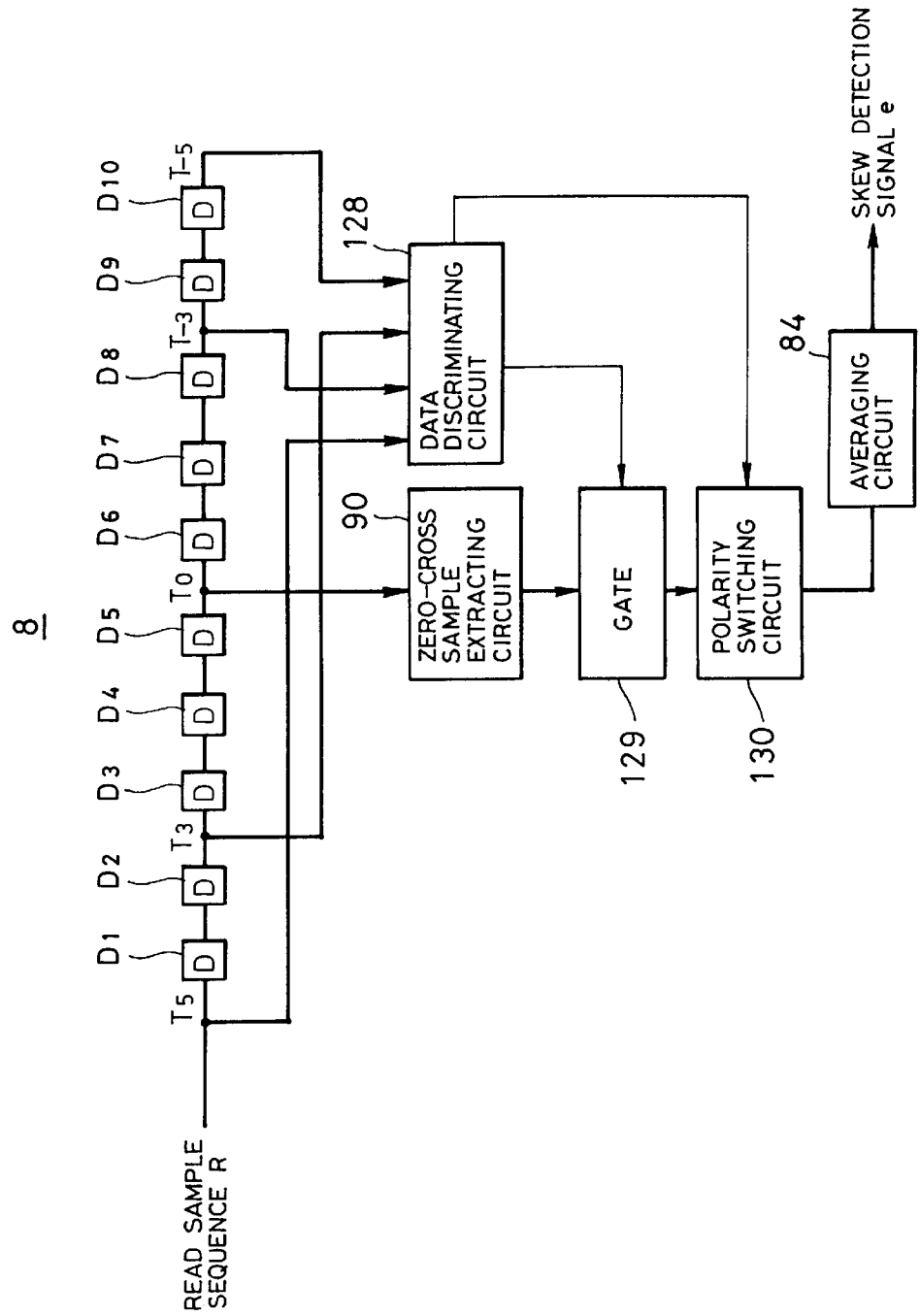
FIG. 15 is a diagram showing a circuit construction of the skew detecting apparatus 8 according to further another embodiment of the invention.

The skew detecting apparatus 8 shown in FIG. 13 can be also changed to a construction shown in FIG. 15.

In FIG. 15, the zero-cross sample extracting circuit 90 extracts a sample existing at a position that is closest to a zero-crossing time point when the polarity of the read sampling value is changed from the positive polarity to the negative polarity or from the negative polarity to the positive polarity from the output sequence of the unit delay element $D_5$, namely, extracts a zero-cross sample and supplies it as an error value (G) to a gate circuit 129.

Figure 16:
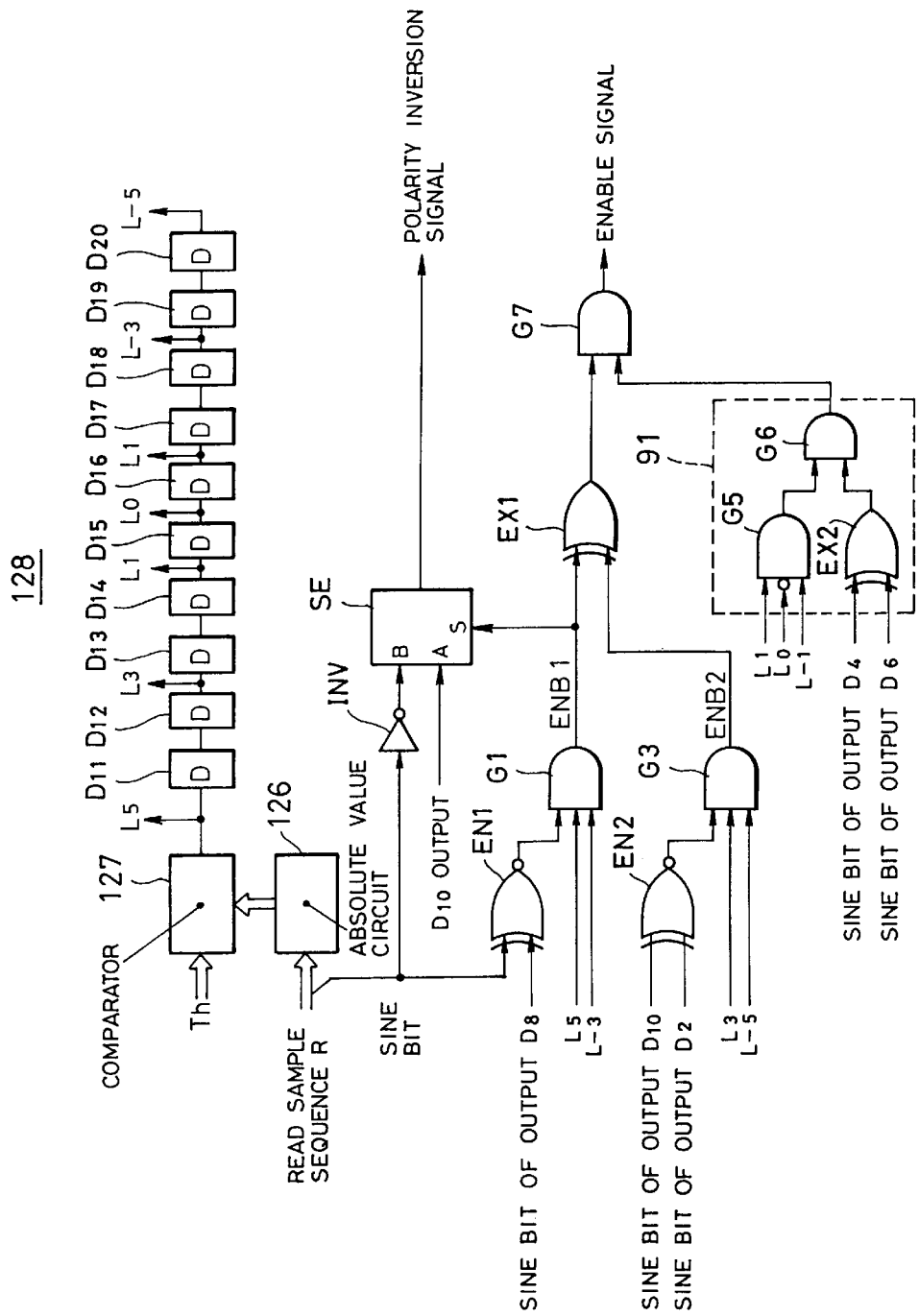
FIG. 16 is a diagram showing an internal construction of a data discriminating circuit 128.

FIG. 16 is a diagram showing an internal circuit of a data discriminating circuit 128.

In FIG. 16, the absolute value circuit 126 and comparator 127 supplies a value in which the absolute value of each read sample in the read sample sequence (R) is equal to or larger than the predetermined value Th to the unit delay element $D_{11}$. That is, in the case of a value other than "0", a signal of a logic value "1" is supplied. When the absolute value of each read sample is smaller than the predetermined value Th, a signal of a logic value "0" is supplied. Each of the ten unit delay elements $D_{11}$ to $D_{20}$ which are cascade connected gives a delay time that is equal to one sampling period of the read sample sequence (R). The signal of one bit which is sequentially supplied from the comparator 127 is fetched from the unit delay element $D_{11}$ and is sequentially shifted to the unit delay element $D_{20}$.

A circuit comprising the AND gate G1 and EXNOR gate EN1 generates a signal ENB1 of a logic value "1" when both of the signal generated from the comparator 127 and a signal generated from the unit delay element $D_{18}$ are logical "1" and both of a sign bit of each read sample in the read sample sequence (R) and a sign bit of the value generated from the unit delay element $D_8$ are of the same logic value. In the other cases, the signal ENB1 of a logic value "0" is generated.

A circuit comprising the AND gate G3 and EXNOR gate EN2 generates a signal ENB2 of a logic value "1" only when both of a signal generated from the unit delay element $D_{12}$ and the signal generated from the unit delay element $D_{20}$ are logical "1" and both of a sign bit of the value generated from the unit delay element $D_2$ and a sign bit of the value generated from the unit delay element $D_{10}$ are of the same logic value. In the other cases, the signal ENB2 of a logic value "0" is generated.

A circuit comprising an EXOR gate EX1 and an AND gate G7 generates the enable signal of a logic value "1" only when a logic value of the signal of either one of the signals ENB1 and ENB2 is equal to "1" and the zero-cross detection signal of a logic value "1" is supplied from the zero-cross detecting circuit 91, which will be explained later, and transmits the enable signal to the gate circuit 129.

The zero-cross detecting circuit 91 is made up of the AND gates G5 and G6 and an EXOR gate EX2. With the above construction, the zero-cross detecting circuit 91 generates the zero-cross detection signal of a logic value "1" when logic values of signals generated from the unit delay elements $D_{14}$ to $D_{16}$ are equal to "1", "0", and "1" and both of the sign bits of the values generated from the unit delay elements $D_4$ and $D_6$ are of the same logic value, respectively. The zero-cross detecting circuit 91 supplies the detected zero-cross detection signal to the AND gate G7.

When a logic value of the signal ENB1 is equal to "0", a selector SE supplies the sign bit of the value generated from the unit delay element $D_{10}$ as a polarity inversion signal to a polarity switching circuit 130. When a logic value of the signal ENB1 is equal to "1", the selector SE transmits a signal in which the sign bit of each read sample in the read sample sequence (R) is inverted to the polarity switching circuit 130 as a polarity inversion signal.

The gate circuit 129 in FIG. 15 transmits the error value (G) supplied from the zero-cross sample extracting circuit 90 to the polarity switching circuit 130 only when the enable signal of a logic value "1" is supplied from the data discriminating circuit 128. When the polarity inversion signal of a logic value "1" is supplied from the data discriminating circuit 128, the polarity switching circuit 130 transmits a value in which the polarity of a value supplied from the gate circuit 129 is inverted to the averaging circuit 84. The averaging circuit 84 obtains an average of the values supplied from the polarity switching circuit 130 and generates it as a skew detection signal (e).

In the embodiment, a waveform distortion occurring by the tangential skew is compensated by updating the filter coefficient of the FIR filter 6 on the basis of the skew detection signal (e) detected by the skew detecting apparatus 8.

As shown in FIG. 17, however, the tilt motor can be also controlled on the basis of the skew detection signal (e) detected by the skew detecting apparatus 8.

In FIG. 17, a tilt motor control circuit 19 supplies a driving voltage according to the skew detection signal (e) detected by the skew detecting apparatus 8 to a tilt motor 10. The tilt motor 10 inclines the pickup 3 in the tangential direction according to the driving voltage.

According to the skew detecting apparatus of the invention as described in detail above, since the direction of the tangential skew occurring between the optical disc and the pickup can be detected on the basis of the read signal read from the optical disc, the read signal waveform can be compensated by the circuit construction of a small scale which doesn't use the tilt sensor.

The preferred embodiments of the present invention have been made. It will be obviously understood that those skilled in the art can presume many modifications and variations. All of the modifications and variations are incorporated in the scope of claims of the invention.

What is claimed is:

1. An optical disc skew detecting method of for detecting a tangential skew occurring between a pickup and a recording surface of an optical disk, said pickup receiving a reflection light when a reading beam is irradiated onto the recording surface of the optical disc and converting the reflection light into an electric signal and obtaining the electric signal as a read signal, said method comprising the steps of:

obtaining an error value between each read sampling value and a prediction value in a read sample sequence obtained by sampling said read signal; and detecting said tangential skew on the basis of said error value when a polarity of the read sampling value obtained at a time point that is preceding to a time point when said error value is derived by a predetermined time and a polarity of the read sampling value obtained at a time point that is subsequent to the time point when said error value is derived by said predetermined time are different.

2. A method according to claim 1, wherein said predetermined time equals $\{L_t/(\text{reading linear velocity})\}$, where $L_t$ represents a distance in a spot profile in a tangential direction of a light spot converged onto the recording surface of said optical disc by an irradiation of said reading beam, by which different light intensities are obtained, according to a direction of the tangential skew, at front and rear positions each of which is away by said distance from a position where a maximum light intensity is derived.

3. A method as claimed in claim 2, wherein said $L_t$ satisfies a condition of:

$$\{0.6 \cdot (\lambda/NA)\} < L_t < \{1.0 \cdot (\lambda/NA)\}$$

where, $\lambda$ represents a wavelength of said reading beam, NA represent a numerical aperture of an objective lens of said pickup.

4. A method as claimed in claim 2, wherein said $L_t$ satisfies a condition of:

$$\{0.3 \cdot (\lambda/NA)\} < L_t < \{0.6 \cdot (\lambda/NA)\}$$

where, $\lambda$ represents a wavelength of said reading beam, NA represents a numerical aperture of an objective lens of said pickup.

5. A method as claimed in claim 1, wherein said $L_t$ satisfies a condition of:

$$\{0.6 \cdot (\lambda/NA)\} < L_t < \{1.0 \cdot (\lambda/NA)\}$$

where, $\lambda$ represents a wavelength of said reading beam, NA represent a numerical aperture of an objective lens of said pickup.

6. A method as claimed in claim 1, wherein said $L_t$ satisfies a condition of:

$$\{0.3 \cdot (\lambda/NA)\} < L_t < \{0.6 \cdot (\lambda/NA)\}$$

where, $\lambda$ represents a wavelength of said reading beam, NA represents a numerical aperture of an objective lens of said pickup.

7. A method as claimed in claim 1, wherein said error value is the read sampling value obtained at a time point that is closest to a zero-crossing point in said read sample sequence.

8. A skew detecting method of an optical disc for detecting a tangential skew occurring between a pickup and a recording surface of said optical disc, said pickup receiving a reflection light when a reading beam of a wavelength $\lambda$ is irradiated onto a recording surface of the optical disc which is rotated at a reading linear velocity $V_L$ and converting said reflection light into an electric signal and obtaining said electric signal as a read signal, said method comprising the steps of:

obtaining an error value between each read sampling value in a read sample sequence obtained by sampling said read signal and a prediction value;

extracting each of a first read sampling value obtained at a time point that is preceding to a time point when said error value is derived by a predetermined first time, a second read sampling value obtained at a time point that is subsequent to the time point when said error value is derived by said first time, a third read sampling value obtained at a time point that is preceding to the time point when said error value is derived by a predetermined second time, and a fourth read sampling value obtained at a time point that is subsequent to the time point when said error value is obtained by said second time from said read sample sequence, respectively; and detecting said tangential skew on the basis of a value in which a value obtained by weighting and adding said second and third read sampling values is subtracted from a value obtained by weighting and adding said first and fourth read sampling values, wherein said first and second times respectively satisfy conditions of:

$$\{0.6 \cdot (\lambda/NA)/V_L\} < \text{the first time} < \{1.0 \cdot (\lambda/NA)/V_L\}$$

$$\{0.3 \cdot (\lambda/NA)/V_L\} < \text{the second time} < \{0.6 \cdot (\lambda/NA)/V_L\}$$

where, NA represents a numerical aperture of an objective lens of said pickup.

9. A method as claimed in claim 8, wherein said error value is the read sampling value obtained at a time point that is closest to a zero-crossing point in said read sample sequence.

10. A skew detecting apparatus of an optical disc for detecting a tangential skew occurring between a pickup and a recording surface of said optical disc, said pickup receiving a reflection light when a reading beam of a wavelength $\lambda$ is irradiated onto a recording surface of the optical disc which is rotated at a reading linear velocity $V_L$ and converting said reflection light into an electric signal and obtaining said electric signal as a read signal, said apparatus comprising:

first delay means for delaying the read sample sequence obtained by sampling said read signal by a predetermined delay time and sequentially generating the delayed read sample sequence;

second delay means for further delaying a value generated from said first delay means by said predetermined delay time and sequentially generating the delayed value;

error detecting means for detecting an error value of the value generated from said first delay means;

a first multiplier for multiplying each reading sample in said read sample sequence by said error value;

a second multiplier for multiplying the value generated from said second delay means by said error value; and a subtractor for obtaining a skew detection signal indicative of said tangential skew on the basis of a value in which a multiplication result by said first multiplier is subtracted from a multiplication result by said second multiplier, wherein said predetermined delay time satisfies a condition of:

$$\{0.6 \cdot (\lambda/NA)/V_L\} < \text{the predetermined delay time} < \{1.0 \cdot (\lambda/NA)/V_L\}$$

where, NA represents a numerical aperture of an objective lens of said pickup.

11. An apparatus as claimed in claim 10, wherein said error detecting means extracts a value obtained at a time point that is closest to a zero-crossing point from values generated from said first delay means and uses the extracted value as said error value.

12. A skew detecting apparatus of an optical disc for detecting a tangential skew occurring between a pickup and a recording surface of said optical disc, said pickup receiving a reflection light when a reading beam of a wavelength $\lambda$ is irradiated onto a recording surface of the optical disc which is rotated at a reading linear velocity $V_L$ and converting said reflection light into an electric signal and obtaining said electric signal as a read signal, said apparatus comprising:

first delay means for delaying the read sample sequence obtained by sampling said read signal by a predetermined delay time and sequentially generating the delayed read sample sequence;

second delay means for further delaying a value generated from said first delay means by said predetermined delay time and sequentially generating the delayed value;

error detecting means for detecting an error value of the value generated from said first delay means;

a first multiplier for multiplying each reading sample in said read sample sequence by said error value;

a second multiplier for multiplying the value generated from said second delay means by said error value; and a subtractor for obtaining a skew detection signal indicative of said tangential skew on the basis of a value in which a multiplication result by said first multiplier is subtracted from a multiplication result by said second multiplier, wherein said predetermined delay time satisfies the condition of:

$$\{0.3 \cdot (\lambda/NA)/V_L\} < \text{the predetermined delay time} < \{0.6 \cdot (\lambda/NA)/V_L\}$$

where, NA represents a numerical aperture of an objective lens of said pickup.

13. An apparatus as claimed in claim 12, wherein said error detecting means extracts a value obtained at a time point that is closest to a zero-crossing point from values generated from said first delay means and uses the extracted value as said error value.

14. A skew detecting apparatus of an optical disc for detecting a tangential skew occurring between a pickup and a recording surface of said optical disc, said pickup receiving a reflection light when a reading beam of a wavelength $\lambda$ is irradiated onto the recording surface of the optical disc which is rotated at a reading linear velocity $V_L$ and converting said reflection light into an electric signal and obtaining the electric signal as a read signal, said apparatus comprising:

first delay means for delaying the read sample sequence obtained by sampling said read signal by a predetermined first delay time and sequentially generating the delayed read sample sequence;

second delay means for further delaying a value generated from said first delay means by a predetermined second delay time and sequentially generating the delayed value;

third delay means for further delaying a value generated from said second delay means by said second delay time and sequentially generating the delayed value;

fourth delay means for further delaying a value generated from said third delay means by said first delay time and sequentially generating the delayed value;

error detecting means for detecting an error value of the value generated from said second delay means;

first weight adding means for obtaining a first addition value by weighting and adding the value generated from said first delay means and the value generated from said fourth delay means;

first multiplying means for obtaining a first multiplication value by multiplying said first addition value by said error value;

second weight adding means for obtaining a second addition value by weighting and adding each read sampling value of said read sample sequence and the value generated from said third delay means;

second multiplying means for obtaining a second multiplication value by multiplying said second addition value by said error value; and a subtractor for obtaining a skew detection signal indicative of said tangential skew on the basis of a value obtained by subtracting said second multiplication value from said first multiplication value, wherein said first delay time and said second delay time satisfy the conditions of:

$\{0.3 \cdot (\lambda/NA)/V_L\} <$ the first delay time $< \{0.6 \cdot (\lambda/NA)/V_L\}$;

$\{0.3 \cdot (\lambda/NA)/V_L\} <$ the second delay time $< \{0.4 \cdot (\lambda/NA)/V_L\}$ where, NA represents a numerical aperture of an objective lens of said pickup.

15. An apparatus according to claim 14, wherein said first multiplying means comprises:

first data discriminating means for generating a first enable signal only when it is discriminated that said first addition value is a value other than 0, for generating a first polarity inversion signal of a logic value "1" when said first addition value has a negative polarity, and for generating said first polarity inversion signal of a logic value "0" when said first addition value has a positive polarity; and first polarity switching means for generating said error value as said first multiplication value when said first enable signal is generated and said first polarity inversion signal has a logic value "0", and for generating a value in which a polarity of said error value is inverted as said first multiplication value when said first enable signal is generated and said first polarity inversion signal has a logic value "1", and said second multiplying means comprises:

second data discriminating means for generating a second enable signal only when it is discriminated that said second addition value is a value other than 0, for generating a second polarity inversion signal of a logic value "1" when said second addition value has a negative polarity, and for generating said second polarity inversion signal of a logic value "0" when said second addition value has a positive polarity; and second polarity switching means for generating said error value as said second multiplication value when said second enable signal is generated and said second polarity inversion signal has a logic value "0", and for generating a value in which the polarity of said error value is inverted as said second multiplication value when said second enable signal is generated and said second polarity inversion signal has a logic value "1".

16. An apparatus according to claim 14, wherein said error detecting means extracts a value obtained at a time point that is closest to a zero-crossing point from values generated from said second delay means and sets said extracted value to said error value.

17. A skew detecting apparatus of an optical disc for detecting a tangential skew occurring between a pickup and a recording surface of said optical disc, said pickup receiving a reflection light when a reading beam of a wavelength $\lambda$ is irradiated onto the recording surface of the optical disc which is rotated at a reading linear velocity $V_L$ and converting said reflection light into an electric signal and obtaining said electric signal as a read signal, said apparatus comprising:

first delay means for delaying the read sample sequence obtained by sampling said read signal by a predetermined first delay time and sequentially generating the delayed read sample sequence;

second delay means for further delaying a value generated from said first delay means by a predetermined second delay time and sequentially generating the delayed value;

third delay means for further delaying a value generated from said second delay means by said second delay time and sequentially generating the delayed value;

fourth delay means for further delaying a value generated from said third delay means by said first delay time and sequentially generating the delayed value;

error detecting means for detecting an error value of the value generated from said second delay means;

first multiplying means for obtaining a first multiplication value by multiplying each read sampling value of said read sample sequence by said error value;

second multiplying means for obtaining a second multiplication value by multiplying the value generated from said third delay means by said error value;

third multiplying means for obtaining a third multiplication value by multiplying the value generated from said first delay means by said error value;

fourth multiplying means for obtaining a fourth multiplication value by multiplying the value generated from said fourth delay means by said error value;

first weight adding means for obtaining a first addition value by weighting and adding said fourth multiplication value and said third multiplication value;

second weight adding means for obtaining a second addition value by weighting and adding said second multiplication value and said first multiplication value; and a subtractor for obtaining a skew detection signal indicative of said tangential skew on the basis of a value in which said second addition value is subtracted from said first addition value, wherein said first delay time and said second delay time satisfy the conditions of:

$\{0.3 \cdot (\lambda/NA)/V_L\} <$ the first delay time $< \{0.6 \cdot (\lambda/NA)/V_L\}$;

$\{0.3 \cdot (\lambda/NA)/V_L\} <$ the second delay time $< \{0.4 \cdot (\lambda/NA)/V_L\}$ where, NA represents a numerical aperture of an objective lens of said pickup.

18. An apparatus according to claim 17, wherein said error detecting means extracts a value obtained at a time point that is closest to a zero-crossing point from values generated from said second delay means and sets said extracted value to said error value.

19. A skew detecting apparatus of an optical disc for detecting a tangential skew occurring between a pickup and a recording surface of said optical disc, said pickup receiving a reflection light when a reading beam of a wavelength $\lambda$ is irradiated onto the recording surface of the optical disc which is rotated at a reading linear velocity $V_L$ and converting said reflection light into an electric signal and obtaining said electric signal as a read signal, said apparatus comprising:

first delay means for delaying the read sample sequence obtained by sampling said read signal by a predetermined first delay time and sequentially generating the delayed read sample sequence;

second delay means for further delaying a value generated from said first delay means by a predetermined second delay time and sequentially generating the delayed value;

third delay means for further delaying a value generated from said second delay means by said second delay time and sequentially generating the delayed value;

fourth delay means for further delaying a value generated from said third delay means by said first delay time and sequentially generating the delayed value;

error detecting means for detecting an error value of the value generated from said second delay means;

first weight adding means for obtaining a first addition value by weighting and adding the value generated from said first delay means and the value generated from said fourth delay means;

second weight adding means for obtaining a second addition value by weighting and adding each read sampling value of said read sample sequence and the value generated from said third delay means;

a subtractor for obtaining a subtraction value by subtracting said second addition value from said first addition value; and multiplying means for obtaining a skew detection signal indicative of said tangential skew on the basis of a value obtained by multiplying said subtraction value by said error value, wherein said first delay time and said second delay time satisfy the conditions of:

$$\{0.3 \cdot (\lambda/NA)/V_L\} < \text{the first delay time} < \{0.6 \cdot (\lambda/NA)/V_L\};$$

$$\{0.3 \cdot (\lambda/NA)/V_L\} < \text{the second delay time} < \{0.4 \cdot (\lambda/NA)/V_L\}$$

where, NA represents a numerical aperture of an objective lens of said pickup.

20. An apparatus as claimed in claim 19, wherein said multiplying means comprises:

data discriminating means for generating an enable signal only when it is discriminated that said subtraction value is a value other than 0, for generating a polarity inversion signal of a logic value "1" when said subtraction value has a negative polarity, and for generating said polarity inversion signal of a logic value "0" when said subtraction value has a positive polarity; and polarity switching means for generating said error value as said skew detection signal when said enable signal is generated and said polarity inversion signal has a logic value "0" and for generating a value in which the polarity of said error signal is inverted as said skew detection signal when said enable signal is generated and said polarity inversion signal has a logic value "1".

21. An apparatus according to claim 19, wherein said error detecting means extracts a value obtained at a time point that is closest to a zero-crossing point from values generated from said second delay means and sets said extracted value to said error value.

* * * * *